(12) United States Patent
Zhu

(10) Patent No.: US 12,743,213 B2
(45) Date of Patent: Sep. 22, 2026

(54) STORAGE APPARATUS AND DATA PROCESSING METHOD

(71) Applicant: Huawei Technologies Co., Ltd., Shenzhen (CN)

(72) Inventor: Xiaoming Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/924,421

(22) Filed: Oct. 23, 2024

(65) Prior Publication Data

US 2025/0044954 A1 Feb. 6, 2025

Related U.S. Application Data

(63) Continuation of application No. PCT/CN2023/091832, filed on Apr. 28, 2023.

(30) Foreign Application Priority Data

Apr. 28, 2022 (CN) ........................ 202210471336.0

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
CPC .... G06F 3/0619; G06F 3/0659; G06F 3/0673; G06F 3/0679; G06F 3/0607; G06F 3/0614; G06F 3/0658; G06F 11/0727; G06F 11/076; G06F 11/0772; G06F 2212/1016; G11C 16/10
See application file for complete search history.

(56) References Cited

U.S. PATENT DOCUMENTS

| | | | | |
|---|---|---|---|---|
| 6,493,750 | B1 | 12/2002 | Mathew et al. | |
| 10,802,762 | B1 * | 10/2020 | Gray | G06F 3/0604 |
| 10,846,252 | B2 | 11/2020 | Ware et al. | |
| 2004/0153914 | A1 | 8/2004 | El-Batal | |
| 2013/0151912 | A1 * | 6/2013 | Sevugapandian | G06F 11/1008 714/704 |
| 2014/0181439 | A1 | 6/2014 | Moon et al. | |
| 2015/0006834 | A1 | 1/2015 | Dulloor et al. | |
| 2020/0051649 | A1 | 2/2020 | Her et al. | |

(Continued)

FOREIGN PATENT DOCUMENTS

| | | | |
|---|---|---|---|
| CN | 104239252 | A | 12/2014 |
| CN | 110535692 | A | 12/2019 |

(Continued)

*Primary Examiner* — Hiep T Nguyen
(74) *Attorney, Agent, or Firm* — Conley Rose, P.C.

(57) ABSTRACT

A storage apparatus includes a controller and a storage medium that are connected to each other. The controller is configured to send a data processing instruction to the storage medium. After executing the data processing instruction, the storage medium is configured to send a target identifier to the controller. The target identifier is at least one of a first identifier and a second identifier, the first identifier indicates the data processing instruction, and the second identifier indicates a fault status. The controller is further configured to confirm, based on the target identifier, that the storage medium has executed the data processing instruction.

19 Claims, 9 Drawing Sheets

(56) References Cited

U.S. PATENT DOCUMENTS

| | | | | |
|---|---|---|---|---|
| 2020/0125277 | A1* | 4/2020 | Greco | G06F 3/0659 |
| 2022/0091775 | A1 | 3/2022 | Shridhar et al. | |
| 2024/0248794 | A1* | 7/2024 | Xu | G06F 11/1068 |

FOREIGN PATENT DOCUMENTS

| | | | |
|---|---|---|---|
| CN | 113157611 | A | 7/2021 |
| CN | 113867615 | A | 12/2021 |
| JP | H05324547 | A | 12/1993 |
| JP | 2002259322 | A | 9/2002 |
| JP | 2019020808 | A | 2/2019 |
| KR | 20210089266 | A | 7/2021 |

* cited by examiner

STORAGE APPARATUS AND DATA PROCESSING METHOD

CROSS-REFERENCE TO RELATED APPLICATIONS

This is a continuation of Int'l Patent App. No. PCT/CN2023/091832, filed on Apr. 28, 2023, which claims priority to Chinese Patent App. No. 202210471336.0, filed on Apr. 28, 2022, both of which are incorporated by reference.

FIELD

This disclosure relates to the field of computer technologies, and in particular, to a storage apparatus and a data processing method.

BACKGROUND

In a computer device, a storage medium stores data. A controller and the storage medium that are included in the computer device interact with each other to implement data processing. The data processing includes but is not limited to data reading and data writing.

In a technology, a controller sends a data processing instruction to a storage medium, and after waiting for fixed duration, the controller considers by default that the storage medium has executed the data processing instruction.

However, time consumed by the storage medium to execute the data processing instruction may change. In a data processing process, if the consumed time is less than the fixed duration, the controller needs to wait for an extra duration. This reduces data processing efficiency. If the consumed time is greater than the fixed duration, the storage medium has not executed the data processing instruction when the controller considers by default that the storage medium has executed the data processing instruction. This reduces data processing reliability. In conclusion, the data processing process in the technology is not flexible enough.

SUMMARY

This disclosure provides a storage apparatus and a data processing method, to resolve problems that a data processing process in a technology has low efficiency, low reliability, and insufficient flexibility. Technical solutions include the following aspects.

According to a first aspect, a storage apparatus is provided. The storage apparatus includes a controller and a storage medium that are connected to each other. In the storage apparatus, the controller is configured to send a data processing instruction to the storage medium. After executing the data processing instruction, the storage medium is configured to send a target identifier to the controller. The target identifier is at least one of a first identifier and a second identifier, the first identifier indicates the data processing instruction, and the second identifier indicates a fault status. In addition, the controller is further configured to confirm, based on the target identifier, that the storage medium has executed the data processing instruction.

After executing the data processing instruction sent by the controller, the storage medium returns the target identifier to the controller. In this case, after receiving the target identifier, the controller may confirm that the storage medium has executed the data processing instruction. In this way, the controller does not need to consider by default, after waiting for fixed duration, that the storage medium has executed the data processing instruction. Therefore, efficiency and reliability of a data processing process are considered, and flexibility of the data processing process is improved.

The target identifier is at least one of the first identifier and the second identifier, the first identifier indicates the data processing instruction, and the second identifier indicates the fault status. When there is one data processing instruction, the target identifier is only the first identifier, is only the second identifier, or is the first identifier and the second identifier. In this case, the controller can identify, based on the target identifier, the data processing instruction executed by the storage medium. When there are at least two data processing instructions, the target identifier is only the first identifier, or is the first identifier and the second identifier. In this case, the controller can identify, based on the target identifier, the data processing instruction executed by the storage medium.

Moreover, in addition to being used by the controller to confirm that the storage medium has executed the data processing instruction, the first identifier may be further used by the controller to perform identification on, when the data processing instruction is a data read instruction, a data read instruction corresponding to service data returned by the storage medium. Therefore, the controller does not need to schedule a sending sequence of the data read instruction, and does not need to command the storage medium to return the service data at specified time and in a specified sequence. Therefore, design complexity of the controller can be simplified. In addition, because the storage medium does not need to return the service data at the specified time and in the specified sequence, the storage medium does not need to control time consumed for executing each data read instruction. In this case, the storage medium does not need to ensure delay consistency in a life periodicity. In addition to being used by the controller to confirm that the storage medium has executed the data processing instruction, the second identifier may be further used by the controller to confirm in time whether an execution process of the data processing instruction is faulty.

The storage medium may include a command decoder, a row address decoder, a column address decoder, a non-volatile storage unit, a volatile storage unit, and an I/O circuit interface. The command decoder receives the data processing instruction sent by the controller, and parses the data processing instruction to obtain instructions for the row address decoder and the column address decoder. The row address decoder and the column address decoder enable the non-volatile storage unit based on the instructions of the command decoder. The data processing instruction is executed through interaction between an enabled non-volatile storage unit, the volatile storage unit, and the I/O circuit interface. Then, the I/O circuit interface sends the target identifier to the controller.

In a possible implementation, the controller is further configured to send a third identifier corresponding to the data processing instruction to the storage medium. The target identifier is at least one of the third identifier and the second identifier.

The storage medium does not need to determine the first identifier indicating the data processing instruction, but uses the third identifier sent by the controller as the first identifier. For example, the command decoder included in the storage medium receives the third identifier, and sends the third identifier to the I/O circuit interface. The I/O circuit interface uses the third identifier as the first identifier. When the target identifier includes the first identifier, the I/O circuit interface may send the first identifier to the controller.

In a possible implementation, the first identifier includes at least one of an identifier of a storage unit and an identifier of the storage medium. The storage unit is at least one of one or more storage units included in the storage medium, and the storage unit is used in the execution process of the data processing instruction.

That is, the storage medium determines the first identifier indicating the data processing instruction. For example, after parsing the data processing instruction, the command decoder determines a storage unit configured to execute the data processing instruction, and determines the first identifier based on at least one of an identifier of the storage unit and an identifier of a storage medium in which the command decoder is located. Then, the command decoder sends the first identifier to the I/O circuit interface. When the target identifier includes the first identifier, the I/O circuit interface may send the first identifier to the controller.

In a possible implementation, the storage medium is further configured to: obtain feature data in the execution process of the data processing instruction, compare the feature data with reference data, and generate the second identifier.

The feature data represents the execution process of the data processing instruction in a form of data. Therefore, it may be determined, by comparing the feature data with the reference data, whether the execution process of the data processing instruction is faulty, so that the second identifier indicating the fault status is generated. For example, the storage medium further includes a comparator, and the storage medium further stores the reference data. The comparator obtains the feature data, and reads the stored reference data, and therefore generates the second identifier by comparing the feature data with the reference data.

In a possible implementation, the storage medium is configured to obtain, in the execution process of the data processing instruction, the feature data based on data generated by an element included in the storage medium.

In the execution process of the data processing instruction, elements included in the storage medium separately perform corresponding actions. For example, the command decoder performs a parsing action, and the row address decoder and the column address decoder perform enabling actions. In this way, the elements included in the storage medium generate data, so that the feature data can be obtained based on the data generated by the element included in the storage medium. For example, the storage medium includes a sensor. The sensor obtains, through detection, the data generated by the element included in the storage medium, and the comparator obtains the feature data based on the data detected by the sensor. The comparator further reads the reference data, and generates the second identifier by comparing the feature data with the reference data.

In a possible implementation, the feature data includes at least one of current data, voltage data, temperature data, and element attribute data.

In this implementation, the feature data may include a plurality of types of data.

In a possible implementation, the data processing instruction instructs to read service data. The storage medium is configured to obtain, in the execution process of the data processing instruction, the feature data based on the read service data.

In a data read process, a transmission direction of the service data is from the non-volatile storage unit, to the volatile storage unit, to the I/O circuit interface, and finally to the controller. For example, the comparator reads service data cached in the volatile storage unit, obtains the feature data based on the service data, and further obtains the stored reference data. In this way, the comparator generates the second identifier by comparing the feature data with the reference data.

In a possible implementation, the data processing instruction instructs to write service data. The storage medium is configured to: read the written service data in the execution process of the data processing instruction, and obtain the feature data based on the read service data.

In a data write process, a transmission direction of the service data is from the controller, to the I/O circuit interface, to the volatile storage unit, and finally to the non-volatile storage unit. For example, the comparator reads the written service data from the non-volatile storage unit, and obtains the feature data based on the service data. The comparator reads cached service data from the volatile storage unit, and uses the service data as the reference data. Then, the comparator compares the feature data with the reference data, and generates the second identifier.

In a possible implementation, in response to that a difference between the feature data and the reference data is less than or equal to a difference threshold, the fault status indicated by the second identifier is that no fault exists. Alternatively, in response to that a difference between the feature data and the reference data is greater than a difference threshold, the fault status indicated by the second identifier is that a fault exists.

In this implementation, differences between the feature data and the reference data are different. In this case, fault statuses indicated by the second identifier are different. A manner of generating the second identifier is simple, easy, and flexible.

In a possible implementation, the data processing instruction instructs to write the service data, and the data processing instruction corresponds to a first storage unit. The controller is further configured to: in response to that the fault status indicated by the second identifier is that the fault exists, send an updated data processing instruction to the storage medium. The updated data processing instruction instructs to write the service data into a second storage unit. The first storage unit and the second storage unit are different storage units included in the storage medium. The storage medium is further configured to execute the updated data processing instruction.

The controller determines, based on the second identifier, that a process of writing the service data into the first storage unit is faulty. In this case, the controller rewrites the service data into another second storage unit. Therefore, successful writing of the service data is ensured, a loss of the service data is avoided, and data processing reliability is improved.

In a possible implementation, the controller is further configured to mark the first storage unit as an unreliable storage unit.

Because the process of writing the service data into the first storage unit is faulty, the first storage unit needs to be marked, to protect or focus on the first storage unit, so that an impact on the data processing reliability is avoided when the first storage unit is continuously used to execute the data processing instruction subsequently.

In a possible implementation, after the first storage unit is marked as the unreliable storage unit, the controller is further configured to: in response to that a quantity of times for which an error occurs in the first storage unit is greater than or equal to a threshold of the quantity of times, mark the first storage unit as a damaged storage unit, and stop using the first storage unit.

When the quantity of times for which the error occurs in the first storage unit is large, the first storage unit is no longer used, to avoid affecting the data processing reliability.

In a possible implementation, the data processing instruction instructs to write the service data. The storage medium is configured to store the service data in a non-volatile storage. The controller is further configured to delete service data in a volatile storage based on the target identifier.

Because the controller may determine, based on the target identifier, that the storage medium has executed the data processing instruction, in other words, the storage medium stores the service data in the non-volatile storage, the controller may delete the service data in the volatile storage, in other words, delete the cached service data, to release volatile storage space and avoid occupying additional volatile storage space.

In a possible implementation, the data processing instruction instructs to read the service data. The storage medium is further configured to send the read service data to the controller. A sending path of the read service data is different from that of the first identifier.

The controller is further configured to: receive the read service data and the first identifier on different sending paths, and determine a priority of the read service data based on the first identifier.

In response to that the priority of the read service data is higher than a priority of other data currently processed by the controller, the controller is further configured to: interrupt a processing process of the other data, and process the read service data.

The controller performs identification on the priority of the service data based on the first identifier. When the priority of the service data is relatively high, the service data may interrupt the process of processing, by the controller, the other data having the relatively low priority. Therefore, service data having a high priority can be processed by the controller, and data processing flexibility is high.

In a possible implementation, the data processing instruction instructs to read the service data. The controller is further configured to: in response to that the fault status indicated by the second identifier is that a fault exists, perform an error correction process, to recover the service data.

The controller may identify a faulty data read process in time based on the second identifier, and perform the error correction process, to recover the service data. This avoids an error occurring in the service data and ensuring the data processing reliability.

According to a second aspect, a data processing method is provided. The method is applied to a controller included in a storage apparatus, and the storage apparatus further includes a storage medium connected to the controller. The method includes the following steps.

The controller first sends a data processing instruction to the storage medium, and then receives a target identifier sent by the storage medium. The target identifier is at least one of a first identifier and a second identifier. The first identifier indicates the data processing instruction, the second identifier indicates a fault status, and the second identifier is generated based on an execution process of the data processing instruction of the storage medium. Then, the controller confirms, based on the target identifier, that the storage medium has executed the data processing instruction.

In a possible implementation, the method further includes: The controller sends a third identifier corresponding to the data processing instruction to the storage medium. The target identifier is at least one of the third identifier and the second identifier.

In a possible implementation, the first identifier includes at least one of an identifier of a storage unit and an identifier of the storage medium. The storage unit is at least one of one or more storage units included in the storage medium, and the storage unit is used in the execution process of the data processing instruction.

In a possible implementation, the data processing instruction instructs to write service data, and the data processing instruction corresponds to a first storage unit. The method further includes: In response to that the fault status indicated by the second identifier is that a fault exists, the controller sends an updated data processing instruction to the storage medium. The updated data processing instruction instructs to write the service data into a second storage unit. The first storage unit and the second storage unit are different storage units included in the storage medium.

In a possible implementation, the method further includes: The controller marks the first storage unit as an unreliable storage unit.

In a possible implementation, after the controller marks the first storage unit as the unreliable storage unit, the method further includes: In response to that a quantity of times for which an error occurs in the first storage unit is greater than or equal to a threshold of the quantity of times, the controller marks the first storage unit as a damaged storage unit, and stops using the first storage unit.

In a possible implementation, the data processing instruction instructs to write the service data. The storage medium is configured to store the service data in a non-volatile storage. The method further includes: The controller deletes service data in a volatile storage based on the target identifier.

In a possible implementation, the data processing instruction instructs to read the service data. The method further includes: The controller receives the service data read by the storage medium and the first identifier on different sending paths, and determines a priority of the read service data based on the first identifier.

In response to that the priority of the read service data is higher than a priority of other data currently processed by the controller, the controller interrupts a processing process of the other data, and processes the read service data.

In a possible implementation, the data processing instruction instructs to read the service data. The method further includes: In response to that the fault status indicated by the second identifier is that a fault exists, the controller performs an error correction process, to recover the service data.

According to a third aspect, a data processing method is provided. The method is applied to a storage medium included in a storage apparatus, and the storage apparatus further includes a controller connected to the storage medium. The method includes the following steps.

First, the storage medium receives a data processing instruction sent by the controller. Then, the storage medium executes the data processing instruction, and sends a target identifier to the controller. The target identifier is at least one of a first identifier and a second identifier, the first identifier indicates the data processing instruction, the second identifier indicates a fault status, and the second identifier is generated based on an execution process of the data processing instruction.

In a possible implementation, the method further includes: The storage medium receives a third identifier corresponding to the data processing instruction sent by the controller. The target identifier is at least one of the third identifier and the second identifier.

In a possible implementation, the first identifier includes at least one of an identifier of a storage unit and an identifier of the storage medium. The storage unit is at least one of one or more storage units included in the storage medium, and the storage unit is used in the execution process of the data processing instruction.

In a possible implementation, the method further includes: The storage medium obtains feature data in the execution process of the data processing instruction, compares the feature data with reference data, and generates the second identifier.

In a possible implementation, that the storage medium obtains feature data in the execution process of the data processing instruction includes: The storage medium obtains, in the execution process of the data processing instruction, the feature data based on data generated by an element included in the storage medium.

In a possible implementation, the feature data includes at least one of current data, voltage data, temperature data, and element attribute data.

In a possible implementation, the data processing instruction instructs to read service data, and that the storage medium obtains feature data in the execution process of the data processing instruction includes: The storage medium obtains, in the execution process of the data processing instruction, the feature data based on the read service data.

In a possible implementation, the data processing instruction instructs to write service data, and that the storage medium obtains feature data in the execution process of the data processing instruction includes: The storage medium reads the written service data in the execution process of the data processing instruction, and obtains the feature data based on the read service data.

In a possible implementation, in response to that a difference between the feature data and the reference data is less than or equal to a difference threshold, the fault status indicated by the second identifier is that no fault exists. Alternatively, in response to that a difference between the feature data and the reference data is greater than a difference threshold, the fault status indicated by the second identifier is that a fault exists.

In a possible implementation, the data processing instruction instructs to read the service data. The method further includes: The storage medium sends the read service data to the controller. A sending path of the read service data is different from that of the first identifier. The controller is configured to: receive the read service data and the first identifier on different sending paths, and determine a priority of the read service data based on the first identifier, and in response to that the priority of the read service data is higher than a priority of other data currently processed by the controller, interrupt a processing process of the other data, and process the read service data.

DETAILED DESCRIPTION

Terms used in implementations are only used to explain specific embodiments, but are not intended to limit this disclosure.

Figure 1:
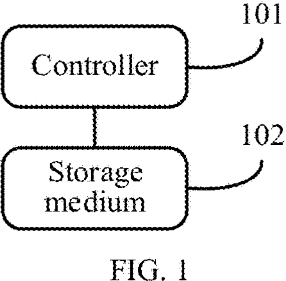
FIG. 1 is a schematic diagram of a structure of a storage apparatus according to an embodiment.

An embodiment provides a storage apparatus. As shown in FIG. 1, the storage apparatus includes a controller 101 and a storage medium 102. The controller 101 and the storage medium 102 are connected to each other. The controller 101 is configured to send a data processing instruction to the storage medium 102. The storage medium 102 is configured to: execute the data processing instruction, and send a target identifier to the controller 101. The controller 101 is further configured to confirm, based on the target identifier, that the storage medium 102 has executed the data processing instruction. The target identifier is at least one of a first identifier and a second identifier. The first identifier indicates the data processing instruction, the second identifier indicates a fault status, and the second identifier is generated based on an execution process of the data processing instruction.

Functions of the controller 101 and the storage medium 102 are described in detail in the following method embodiments corresponding to FIG. 6 to FIG. 9, FIG. 11 to FIG. 15, and FIG. 17. The following first describes a plurality of elements included in the storage medium 102 and connection relationships between some of the plurality of elements and the controller 101.

Figure 2:
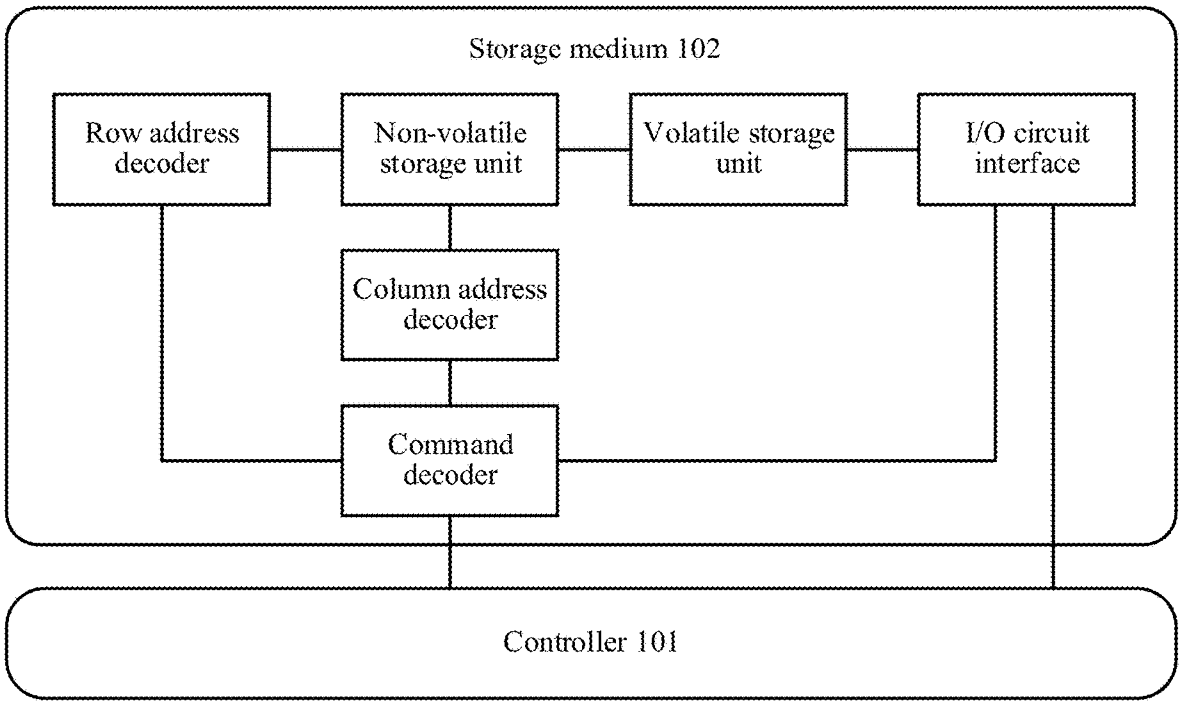
FIG. 2 is a schematic diagram of a structure of another storage apparatus according to an embodiment.

A storage medium 102 is a logical unit, and the logic unit is also referred to as a die. As shown in FIG. 2, a storage medium 102 includes a command decoder, at least one volatile storage unit, at least one non-volatile storage unit, a row address decoder, a column address decoder, and an input/output (I/O) circuit interface. One non-volatile storage unit includes at least one minimum operation unit, the column address decoder is also referred to as an address decoder of a minimum operation unit, and the I/O circuit interface is also referred to as an I/O circuit.

The command decoder is separately connected to the row address decoder, the column address decoder, and the I/O circuit interface. The row address decoder and the column address decoder are further separately connected to the non-volatile storage unit. The non-volatile storage unit is further connected to the volatile storage unit, and the volatile storage unit is further connected to the I/O circuit interface. In addition, the command decoder is further connected to the controller 101, to receive a data processing instruction sent by the controller 101. The I/O circuit interface is further connected to the controller 101, to exchange service data corresponding to the data processing instruction with the controller 101.

Figure 3:
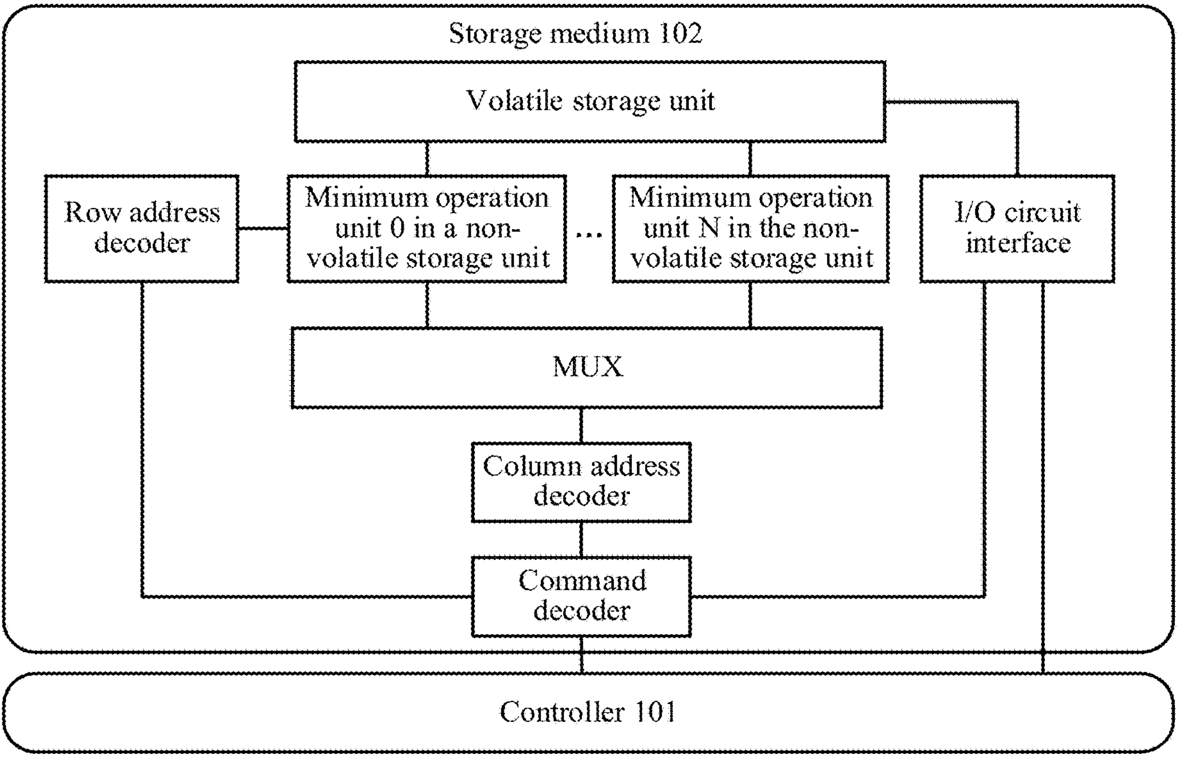
FIG. 3 is a schematic diagram of a structure of still another storage apparatus according to an embodiment.

For example, the storage medium 102 further includes a multiplexer (MUX). Correspondingly, the column address decoder is connected to at least one minimum operation unit in the non-volatile memory cell via the MUX. For example, refer to FIG. 3. When a non-volatile storage unit includes at least two minimum operation units (in other words, a value of N in FIG. 3 is an integer not less than 1, and a quantity of minimum operation units is N+1), a column address decoder is separately connected to the at least two minimum operation units via a MUX.

Figure 4:
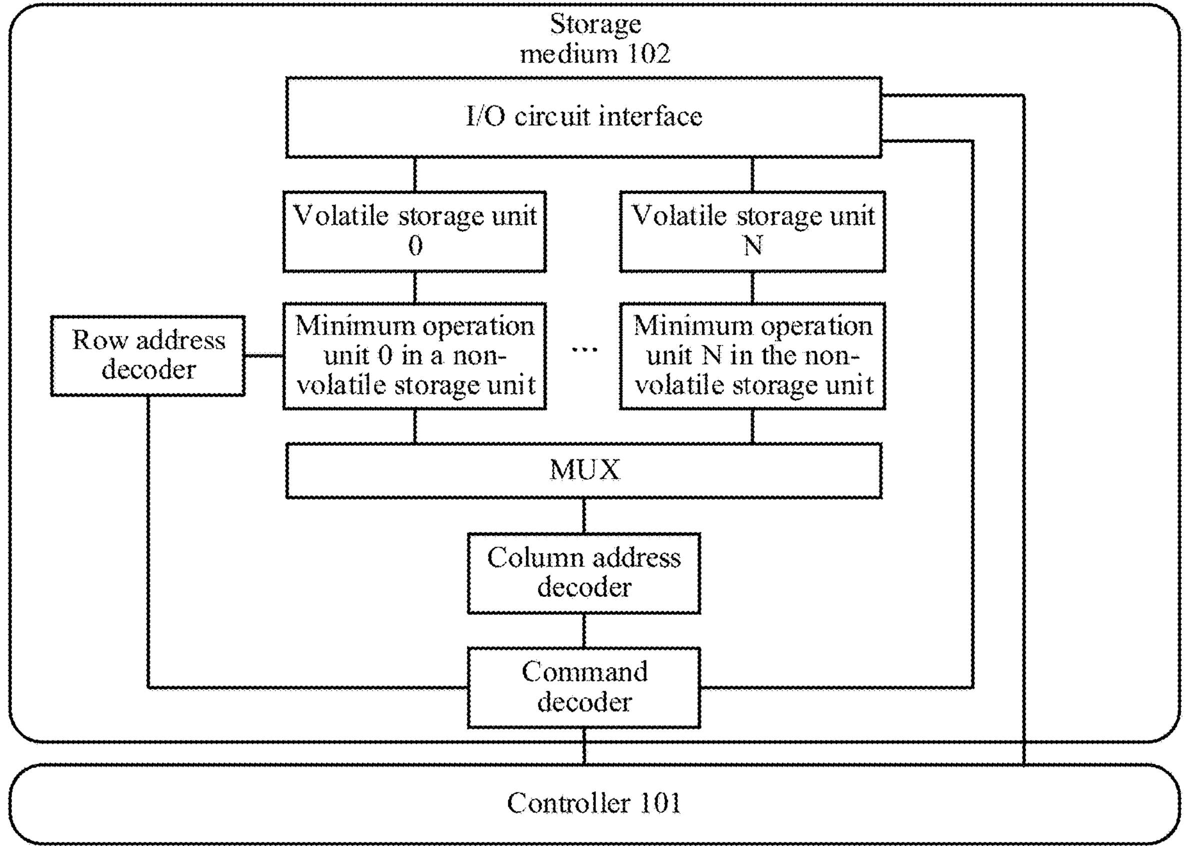
FIG. 4 is a schematic diagram of a structure of yet another storage apparatus according to an embodiment.

In some implementations, the volatile storage unit includes at least one of a central volatile storage unit and a distributed volatile storage unit. One central volatile storage unit may be connected to all or some minimum operation units in the non-volatile storage unit. For example, a volatile storage unit shown in FIG. 3 is a central volatile storage unit. One distributed volatile storage unit may be connected to a minimum operation unit in one non-volatile storage unit. For example, a volatile storage unit shown in FIG. 4 is a distributed volatile storage unit. The central volatile storage unit and the distributed volatile storage unit are not limited in embodiments. For example, the central volatile storage unit includes but is not limited to a static random-access memory (SRAM). The distributed volatile storage unit includes but is not limited to a page register.

For example, at least two of the command decoder, the row address decoder, and the address decoder of the minimum operation unit may be integrated into one decoder. For example, the command decoder and the address decoder of the minimum operation unit are integrated into one decoder, and the decoder obtained through integration is an address decoder of an instruction and the minimum operation unit.

Figure 5:
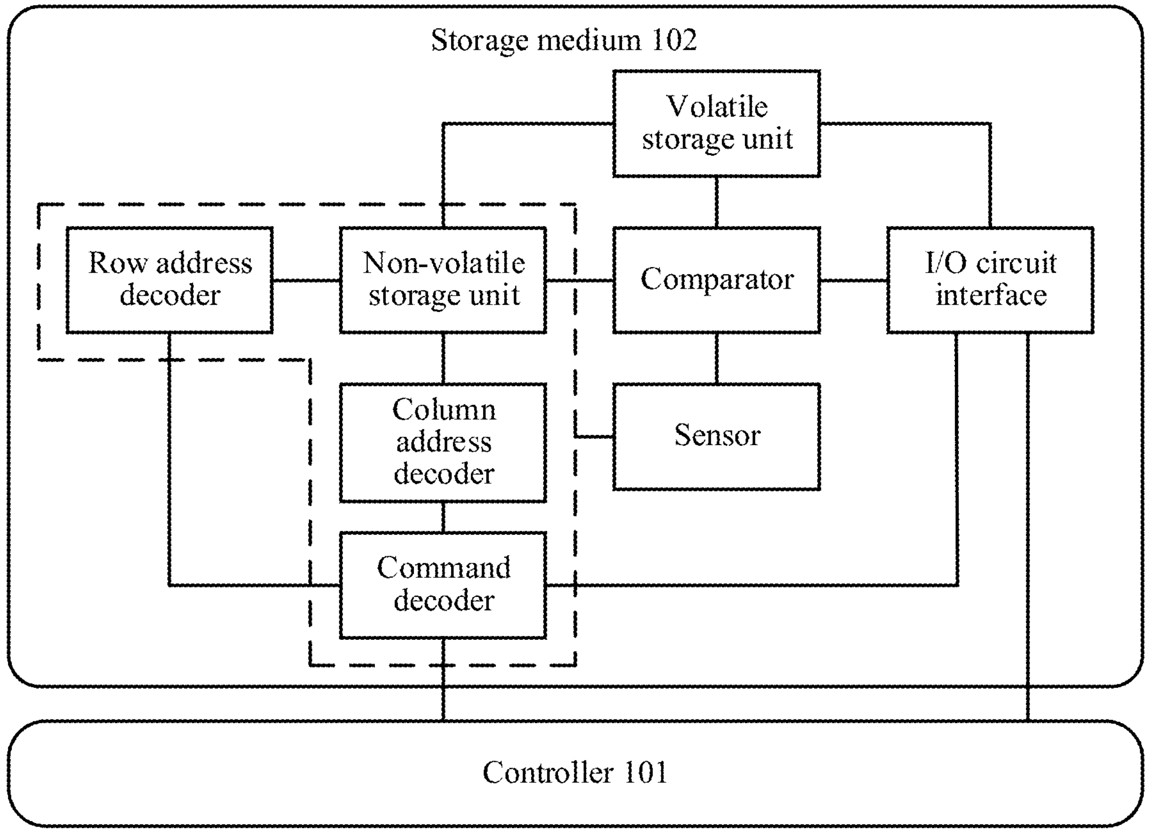
FIG. 5 is a schematic diagram of a structure of still yet another storage apparatus according to an embodiment.

For example, refer to FIG. 5. A storage medium 102 further includes an on-chip (on-die) integrated comparator. A non-volatile storage unit, a volatile storage unit, and an I/O circuit interface are separately connected to the comparator. In some implementations, the comparator may be integrated with the volatile storage unit.

For example, refer to FIG. 5. The storage medium 102 further includes a sensor. The sensor is connected to the comparator, and the sensor is further connected to at least one element in a command decoder, a row address decoder, a column address decoder, and the non-volatile storage unit. In some implementations, the sensor is a sensing circuit.

For example, the non-volatile storage unit includes but is not limited to a storage-class memory (SCM), a read-only memory (ROM), a programmable ROM (PROM), an erasable PROM (EPROM), an electrically EPROM (EEPROM), or a flash memory. The flash memory is, for example, a not and (NAND) flash memory.

For example, in addition to the page register and the SRAM, the volatile storage unit may further include but is not limited to a dynamic random-access memory (DRAM), a synchronous DRAM (SDRAM), a double data rate (DDR) SDRAM, an enhanced SDRAM (ESDRAM), a synchronous-link DRAM (SLDRAM), and direct Rambus random-access memory (DR RAM).

The foregoing describes, with reference to FIG. 2 to FIG. 5, the plurality of elements included in the storage medium 102 and the connection relationships between the some of the plurality of elements and the controller 101.

It should be understood that FIG. 1 to FIG. 5 show example structures of the storage apparatuses, and FIG. 1 to FIG. 5 do not constitute a limitation on a structure of the storage apparatus. If a storage apparatus of another structure, for example, is applicable to embodiments, the storage apparatus should also fall within the protection scope of embodiments.

Figure 6:
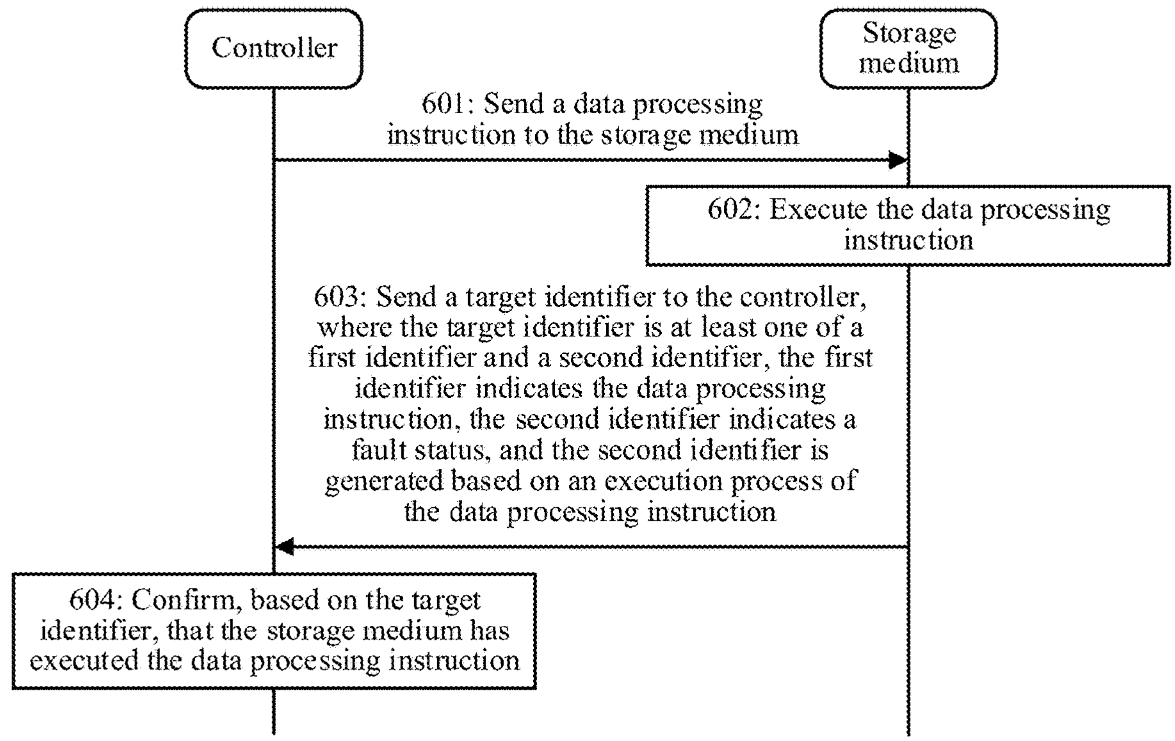
FIG. 6 is a flowchart of a data processing method according to an embodiment.

An embodiment provides a data processing method. An example in which the data processing method is applied to the storage apparatuses shown in FIG. 1 to FIG. 5 is used. The data processing method is implemented through interaction between the controller 101 and the storage medium 102. As shown in FIG. 6, the data processing method includes the following step 601 to step 604.

Step 601: A controller sends a data processing instruction to a storage medium.

The data processing instruction sent by the controller to the storage medium instructs to process service data. The service data is data that needs to be processed. For example, the data processing instruction includes an identifier of a storage unit and an identifier of a processing manner. The identifier of the storage unit indicates to use a non-volatile storage unit included in the storage medium to process the service data. The identifier of the processing manner indicates a processing manner corresponding to the service data.

In some implementations, the processing manner includes but is not limited to reading, writing, and the like. This is not limited herein. When the processing manner indicated by the identifier of the processing manner is reading, the data processing instruction instructs to read the service data. In other words, the data processing instruction is a data read instruction. When the processing manner indicated by identifier of the processing manner is writing, the data processing instruction instructs to write the service data. In other words, the data processing instruction is a data write instruction. For example, the identifier of the processing manner is a first value, where the first value indicates that the processing manner is reading. The processing manner identifier is a second value, where the second value indicates that the processing manner is writing. The first value is different from the second value. The first value and the second value are not limited in this embodiment, and these values may be set based on experience or actual requirements.

In an example embodiment, the data processing instruction further corresponds to an address. The controller further sends the address to the storage medium. The address is an address used to process the service data. For example, the address is an address in a storage unit indicated by the identifier of the storage unit, that is, the non-volatile storage unit. In some implementations, the controller separately sends, to the storage medium in different transmission periodicities, the data processing instruction and the address corresponding to the data processing instruction. For example, the controller first sends the data processing instruction to the storage medium in one transmission periodicity, and then sends the address to the storage medium in another transmission periodicity used after the transmission periodicity. In some other implementations, the address may alternatively be carried in the data processing instruction. The controller sends, to the storage medium in one transmission periodicity, the data processing instruction that carries the address. A duration of the transmission periodicity is not limited in this embodiment, and the duration of the transmission periodicity may be set based on experience or an actual requirement.

For example, refer to the storage apparatuses shown in FIG. 2 to FIG. 5. The storage medium includes a command decoder. In this case, the controller sends the data processing instruction and the address to the command decoder.

Step 602: The storage medium executes the data processing instruction.

After the controller sends the data processing instruction to the storage medium, the storage medium receives the data processing instruction, and executes the data processing instruction. For example, that the storage medium executes the data processing instruction includes: The storage medium parses the data processing instruction to obtain the identifier of the storage unit and the identifier of the processing manner, determines, based on the identifier of the storage unit, a storage unit that needs to be used to process the service data, and determines the processing manner based on the identifier of the processing manner, so that the storage medium processes the service data in the determined storage unit in the determined processing manner.

In some implementations, in addition to receiving the data processing instruction, the storage medium further receives the address sent by the controller. In some other implementations, the data processing instruction carries the address. The storage medium parses the data processing instruction to obtain the address. Regardless of a manner in which the storage medium obtains the address, the storage medium may process, based on the address, the service data in the determined storage unit in the determined processing manner. When the data processing instruction is a data read instruction, the storage medium reads the service data from the address in the determined storage unit. Then, the storage medium sends the read service data to the controller. When the data processing instruction is a data write instruction, the storage medium writes the service data into the address in the determined storage unit. The service data is sent by the controller to the storage medium.

For example, when the data processing instruction is the data write instruction, the storage medium may not obtain the address, but randomly select an unoccupied address from the determined storage unit, and write the service data by using the selected address. Correspondingly, the storage medium further sends the selected address to the controller, so that the controller obtains the address into which the service data is written.

For example, refer to the storage apparatuses shown in FIG. 2 to FIG. 5. The storage medium includes a plurality of elements. The following describes an example process in which each element included in the storage medium executes the data processing instruction.

After the controller sends the data processing instruction and the address to the command decoder included in the storage medium, the command decoder receives the data processing instruction and the address, and parses the data processing instruction to obtain the identifier of the storage unit and the identifier of the processing manner. Then, the command decoder determines a first instruction group and a second instruction group based on the address, the identifier of the storage unit, and the identifier of the processing manner. The first instruction group is used by a row address decoder and a column address decoder to enable at least one row of at least one minimum operation unit in the non-volatile storage unit, to exchange the service data between the non-volatile storage unit and a volatile storage unit. The non-volatile storage unit is the storage unit indicated by the identifier of the storage unit, the at least one row of the at least one minimum operation unit is determined based on the address, and a transmission direction of the service data during service data exchange is determined by the processing manner indicated by the identifier of the processing manner. The second instruction set is used to exchange the service data between an I/O circuit interface and the controller, and exchange the service data between the I/O circuit interface and the volatile storage unit. A transmission direction of the service data during service data exchange is also determined by the processing manner indicated by the identifier of the processing manner.

For example, the data processing instruction is a data read instruction. In this case, the command decoder sends the first instruction group to the row address decoder and the column address decoder, so that the row address decoder and the column address decoder enable the at least one row of the at least one minimum operation unit in the non-volatile storage unit. Then, an enabled row in the minimum operation unit sends, to a corresponding volatile storage unit, service data stored in the row, and the volatile storage unit caches the service data. The command decoder further sends the second instruction group to the I/O circuit interface, so that the I/O circuit interface reads the cached service data from the volatile storage unit, and the I/O circuit interface sends the service data to the controller. In other words, in a data read process, a transmission direction of the service data is sequentially from the non-volatile storage unit, to the volatile storage unit, to the I/O circuit interface, and finally to the controller.

For example, the data processing instruction is a data write instruction. In this case, the controller sends the service data to the I/O circuit interface, and the command decoder sends the second instruction group to the I/O circuit interface, so that the I/O circuit interface writes the received service data into the volatile storage unit for caching. Then, the command decoder sends the first instruction group to the row address decoder and the column address decoder, so that the row address decoder and the column address decoder enable the at least one row of the at least one minimum operation unit in the non-volatile storage unit. Then, an enabled row of the minimum operation unit reads the service data from a corresponding volatile storage unit and stores the service data. In other words, in a data write process, a transmission direction of the service data is sequentially from the controller, to the I/O circuit interface, to the volatile storage unit, and finally to the non-volatile storage unit.

In an example embodiment, the first instruction group includes at least one pair of instructions. Each pair of instructions includes one instruction for the row address decoder and one instruction for the column address decoder. Each pair of instructions corresponds to one execution periodicity, and the execution periodicity corresponding to each pair of instructions is at different time. In some implementations, the command decoder sequentially sends each pair of instructions in a time-first order. After receiving the instructions, the row address decoder and the column address decoder execute the instructions, to enable the at least one row of the at least one minimum operation unit in the non-volatile storage unit, and read or write the service data after the enabling is completed. In some other implementations, the command decoder directly sends all pairs of instructions. After receiving the instructions, the row address decoder and the column address decoder execute the instructions in a time-first order, to enable the at least one row of the at least one minimum operation unit in the non-volatile storage unit, and read or write the service data after the enabling is completed. When sending a pair of instructions, the command decoder sends, to the row address decoder, an instruction that is in the pair of instructions and that is for the row address decoder, and sends, to the column address decoder, an instruction that is in the pair of instructions and that is for the column address decoder.

In one execution periodicity, the column address decoder enables at least one minimum operation unit in the non-volatile storage unit via a MUX. The row address decoder enables one row. Therefore, a row of the at least one minimum operation unit in the non-volatile storage unit is enabled through cooperation between the column address decoder and the row address decoder. Then, the service data may be exchanged between an enabled row of the minimum operation unit and a corresponding volatile storage unit. Then, the execution periodicity ends, and a next execution periodicity starts. Details are not described herein. A duration of one execution periodicity is not limited in this embodiment. The duration of the one execution periodicity may be flexibly determined based on performance of the storage medium, provided that the foregoing enabling process and read (or write) process can be completed in the duration of the one execution periodicity.

For example, refer to FIG. 3 and FIG. 4. An example in which a row 0 and a row 1 of a minimum operation unit 0 and a row 0 and a row 1 of a minimum operation unit N in the non-volatile storage medium need to be enabled is used for description.

In the 1st execution periodicity, the command decoder sends a first pair of instructions to the row address decoder and the column address decode. In this case, the column address decoder enables a minimum operation unit 0 and a minimum operation unit N via the MUX, and the row address decoder enables a row 0. Therefore, the row 0 of the minimum operation unit 0 and the row 0 of the minimum operation unit N are enabled through the cooperation between the column address decoder and the row address decoder, so that the service data can be exchanged between an enabled row 0 of the minimum operation unit 0 and an enabled row 0 of the minimum operation unit N and a corresponding volatile storage unit. In FIG. 3, both the minimum operation unit 0 and the minimum operation unit N correspond to a volatile storage unit. In FIG. 4, the minimum operation unit 0 corresponds to a volatile storage unit 0, and the minimum operation unit N corresponds to a volatile storage unit N.

In the 2nd execution periodicity, the command decoder sends a second pair of instructions to the row address decoder and the column address decode. In this case, the column address decoder enables a minimum operation unit 0 and a minimum operation unit N via the MUX, and the row address decoder enables a row 1. Therefore, the row 1 of the minimum operation unit 0 and the row 1 of the minimum operation unit N are enabled through the cooperation between the column address decoder and the row address decoder, so that the service data can be exchanged between an enabled row 1 of the minimum operation unit 0 and an enabled row 1 of the minimum operation unit N and a corresponding volatile storage unit. For volatile storage units corresponding to the minimum operation unit 0 and the minimum operation unit N, refer to the foregoing descriptions. Details are not described herein again.

Step 603: The storage medium sends a target identifier to the controller, where the target identifier is at least one of a first identifier and a second identifier, the first identifier indicates the data processing instruction, the second identifier indicates a fault status, and the second identifier is generated based on an execution process of the data processing instruction.

After executing the data processing instruction, in other words, after completing execution of the data processing instruction, the storage medium sends the target identifier to the controller. The target identifier is at least one of the first identifier and the second identifier. The first identifier indicates the data processing instruction, and the data processing instruction indicated by the first identifier is the data processing instruction that has been executed by the storage medium. The second identifier indicates the fault status, and the fault status includes that a fault exists (that is, abnormality) or that no fault exists (that is, normality). The second identifier is generated based on the execution process of the data processing instruction. For example, although the second identifier is generated based on the execution process of the data processing instruction, the second identifier only indicates the fault status, and does not indicate a fault status corresponding to a specific data processing instruction.

In some implementations, the data processing instruction is a data read instruction. It can be learned from the descriptions in step 602 that the storage medium needs to send the read service data to the controller. Therefore, the storage medium sends the read service data and the target identifier to the controller. For example, at least one signal cable is included between the storage medium and the controller, and the service data and the target identifier may be sent by using different signal cables, or may be sent by using a same signal cable. When the service data and the target identifier are sent by using different signal cables, if the target identifier includes the first identifier and the second identifier, the service data, the first identifier, and the second identifier may be sent by using three different signal cables respectively, the service data and the first identifier may be sent by using one signal cable and the second identifier is sent by using another signal cable, or the service data and the second identifier may be sent by using one signal cable and the first identifier is sent by using another signal cable.

In some other implementations, the data processing instruction is a data write instruction. The storage medium sends only the target identifier to the controller, and does not send the service data to the controller. For example, at least one signal cable is included between the storage medium and the controller. If the target identifier includes only the first identifier or includes only the second identifier, the target identifier may be sent by using one signal cable. If the target identifier includes the first identifier and the second identifier, the first identifier and the second identifier may be sent by using different signal cables, or may be sent by using a same signal cable.

For example, when at least two objects in the service data, the first identifier, and the second identifier are sent by using a same signal cable, a sequence of sending the at least two objects by using the same signal cable needs to be specified, so that the controller identifies each object based on the sequence after performing receiving. In other words, the storage medium sends, by using the same signal cable, the at least two objects in the service data, the first identifier, and the second identifier to the controller in a specific sending sequence. The sending sequence may be set based on experience or an actual requirement. This is not limited herein, provided that both the storage medium and the controller can support the sending sequence. For example, the service data, the first identifier, and the second identifier are all sent by using a same signal cable. The storage medium sequentially sends the first identifier, the second identifier, and the service data to the controller. Correspondingly, after performing receiving, the controller sequentially identifies the first identifier, the second identifier, and the service data.

For example, when at least two objects in the service data, the first identifier, and the second identifier are sent by using different signal cables, the at least two objects need to be sent in a same transmission periodicity, so that the controller identifies correspondences between different objects after performing receiving. In other words, the storage medium sends, by using the different signal cables, at least two objects in the service data, the first identifier, and the second identifier to the controller in the same transmission periodicity, and the controller identifies the objects received in the same transmission periodicity as objects corresponding to each other. For example, the service data, the first identifier, and the second identifier are separately sent by using different signal cables. The storage medium sends the service data, the first identifier, and the second identifier to the controller in a same transmission periodicity. Correspondingly, after receiving the service data, the first identifier, and the second identifier in the same transmission periodicity, the controller identifies that the service data, the first identifier, and the second identifier correspond to each other.

Both a process in which the controller sends the data processing instruction to the storage medium and a process of exchanging the service data between the controller and the storage medium are described in step 602. Details are not described herein again. In addition, for the first identifier, refer to the storage apparatuses shown in FIG. 2 to FIG. 5. The first identifier is sent by the command decoder to the I/O circuit interface, so that the I/O circuit interface sends the first identifier to the controller when the target identifier includes the first identifier. For the second identifier, refer to the storage apparatus shown in FIG. 5. The second identifier is generated by a comparator and sent to the I/O circuit interface, so that the I/O circuit interface sends the second identifier to the controller when the target identifier includes the second identifier. In addition, the signal cable in the foregoing descriptions is a signal cable included in the I/O circuit interface.

The following sequentially describes the first identifier and the second identifier.

In an example embodiment, the first identifier includes but is not limited to the following two types.

Type 1: The first identifier is a third identifier corresponding to the data processing instruction, and the third identifier is sent by the controller to the storage medium. In other words, the method further includes: The controller sends the third identifier corresponding to the data processing instruction to the storage medium. The storage medium receives the third identifier corresponding to the data processing instruction. The target identifier is at least one of the third identifier and the second identifier.

The third identifier may be generated by the controller, or the third identifier is obtained by the controller in another manner. This is not limited herein. The controller stores a first correspondence between the third identifier and the data processing instruction. The first correspondence is used by the controller to perform identification on a corresponding data processing instruction based on a received third identifier. For details, refer to descriptions in step 604 below. For example, the controller separately sends the data processing instruction and the third identifier to the storage medium in different transmission periodicities. Alternatively, the third identifier is carried in the data processing instruction. The controller sends, to the storage medium in one transmission periodicity, the data processing instruction that carries the third identifier. In some implementations, when sending the data processing instruction, the address, and the third identifier to the storage medium, the controller may send the data processing instruction to the storage medium in one transmission periodicity, and send the address and the third identifier to the storage medium in a next transmission periodicity adjacent to the transmission periodicity.

For example, refer to the storage apparatuses shown in FIG. 2 to FIG. 5. The controller sends the third identifier to the command decoder. After receiving the third identifier, the command decoder sends the third identifier to the I/O circuit interface. The third identifier is the first identifier indicating the data processing instruction. Therefore, when the target identifier includes the first identifier, the I/O circuit interface may send the third identifier to the controller.

Type 2: The first identifier includes at least one of the identifier of the storage unit and an identifier of the storage medium. The storage unit is at least one of one or more storage units included in the storage medium, and the storage unit is used in the execution process of the data processing instruction.

Different from the first identifier in Type 1, the first identifier in Type 2 is not sent by the controller to the storage medium, but is generated by the storage medium based on the execution process of the data processing instruction. The first identifier includes at least one of the identifier of the storage unit and the identifier of the storage medium. The storage unit is a storage unit used in the execution process of the data processing instruction, and the storage medium is the storage medium that receives and executes the data processing instruction.

In Type 2, before sending the data processing instruction to the storage medium, the controller determines a storage medium used to execute the data processing instruction and a storage unit included in the storage medium, uses at least one of an identifier of the determined storage medium and an identifier of the determined storage unit as a reference identifier, and stores a second correspondence between the reference identifier and the data processing instruction. The second correspondence is used by the controller to perform identification on a corresponding data processing instruction based on a received first identifier. For details, refer to descriptions in step 604 below. In some implementations, an identifier type included in the reference identifier is the same as that included in the first identifier. The identifier type includes the identifier of the storage unit and the identifier of the storage medium. For example, the first identifier includes the identifier of the storage unit and the identifier of the storage medium. In this case, the reference identifier also includes the identifier of the storage unit and the identifier of the storage medium. In some other implementations, an identifier type included in the reference identifier includes an identifier type included in the first identifier, and further includes an identifier type that is not included in the first identifier. For example, the first identifier includes only the identifier of the storage unit, and the reference identifier includes the identifier of the storage unit and the identifier of the storage medium. In this embodiment, the identifier type included in the reference identifier and the identifier type included in the first identifier may be obtained through negotiation between the controller and the storage medium, or the reference identifier may be set by default. This is not limited herein.

Refer to the storage apparatuses shown in FIG. 2 to FIG. 5. The command decoder determines the storage unit used in the execution process of the data processing instruction, so that at least one of the identifier of the storage unit and an identifier of the storage medium in which the command decoder is located as the first identifier. Then, the command decoder sends the generated first identifier to the I/O circuit interface. Therefore, when the target identifier includes the first identifier, the I/O circuit interface may send the first identifier to the controller.

In an example embodiment, the second identifier is generated by the storage medium based on an execution process of the data processing instruction. Therefore, the method further includes: The storage medium obtains feature data in the execution process of the data processing instruction, compares the feature data with reference data, and generates the second identifier.

Because the feature data is obtained in the execution process of the data processing instruction, the feature data can represent the execution process of the data processing instruction in a form of data. Therefore, by comparing the feature data with the reference data, it can be determined whether the execution process of the data processing instruction is faulty, so that the second identifier indicating the fault status is generated.

In an example embodiment, in response to that a difference between the feature data and the reference data is less than or equal to a difference threshold, the fault status indicated by the second identifier is that no fault exists. Alternatively, in response to that a difference between the feature data and the reference data is greater than a difference threshold, the fault status indicated by the second identifier is that a fault exists. In some implementations, the difference threshold is zero. In this case, when the feature data is completely the same as the reference data, the fault status indicated by the second identifier is that no fault exists. When the feature data is not completely the same as the reference data, and the fault status indicated by the second identifier is that the fault exists. In some other implementations, the difference threshold is not zero. In this case, when the feature data is close enough to the reference data, the fault status indicated by the second identifier is that no fault exists. When the feature data differs greatly from the reference data, the fault status indicated by the second identifier is that the fault exists. The difference threshold is not limited in this embodiment.

In some implementations, the storage medium obtains the feature data only once in the execution process of the data processing instruction. If the difference between the feature data and the reference data is greater than the difference threshold, the storage medium directly generates the second identifier indicating that the fault exists. In some other implementations, the storage medium obtains the feature data at least twice in the execution process of the data processing instruction. If a difference between feature data obtained for the first time and the reference data is greater than the difference threshold, the storage medium repeatedly executes the data processing instruction at least once, re-obtains feature data in each re-execution process, and compares the re-obtained feature data with the reference data. If a quantity of times of repeatedly executing the data processing instruction reaches a repetition threshold, and a difference between the feature data that is re-obtained each time and the reference data is greater than the difference threshold, the second identifier indicating that the fault exists is generated. If a difference between the re-obtained feature data and the reference data is less than or equal to the difference threshold before a quantity of times of repeatedly executing the data processing instruction reaches a repetition threshold, the second identifier indicating that the fault exists is not generated, but the second identifier indicating that no fault exists is generated. The repetition threshold is not limited in this embodiment, and the repetition threshold may be set based on experience or an actual requirement.

For example, an execution manner used for repeatedly executing the data processing instruction is different from an execution manner used for executing the data processing instruction for the first time. In some implementations, parameters used to execute the data processing instruction are different. In this case, it is considered that execution manners are different. For example, if a first parameter is used for executing the data processing instruction for the first time, a second parameter may be used for repeatedly executing the data processing instruction. When the data processing instruction is repeatedly executed at least twice, a same or different execution manner may be used in each time of repeated data processing. For example, a first parameter is used for executing the data processing instruction for the first time, a second parameter may be used for repeatedly executing the data processing instruction for the first time, and a third parameter may be used for executing the data processing instruction for the second time. For example, the first parameter, the second parameter, and the third parameter include a current parameter, a voltage parameter, and the like. The current parameter, the voltage parameter, and the like may be determined based on experience. This is not limited herein.

For example, the reference data is cached in the volatile storage unit. The volatile storage unit may be a storage unit connected to the non-volatile storage unit, for example, the volatile storage unit shown in FIG. 5. In this case, the volatile storage unit is configured to cache the reference data, and is further configured to cache the service data in the execution process of the data processing instruction. Alternatively, the volatile storage unit may be another storage unit dedicated to caching the reference data. In this case, the volatile storage unit is not configured to cache the service data.

In an example embodiment, that the storage medium obtains feature data in the execution process of the data processing instruction includes but is not limited to the following three manners.

Obtaining manner 1: The manner is applicable to a case in which the data processing instruction instructs to read or write the service data, in other words, is used to determine whether the data read process or the data write process is faulty. The storage medium obtains, in the execution process of the data processing instruction, the feature data based on data generated by an element included in the storage medium.

It can be learned from the descriptions of executing the data processing instruction by the storage medium in step 602 that, in the execution process of the data processing instruction, the elements included in the storage medium performs processes such as parsing (for example, the command decoder parses the data processing instruction) and enabling (for example, the row address decoder and the column address decoder enable a storage unit). Therefore, the elements included in the storage medium generate data. For example, the feature data is the data generated by the element included in the storage medium. Alternatively, the data generated by the element included in the storage medium is processed in a first processing manner, to obtain the feature data. In some implementations, the first processing manner includes but is not limited to filtering, calculation, and the like. This is not limited herein.

In an example embodiment, the feature data includes at least one of current data, voltage data, temperature data, and element attribute data. For example, the current data includes but is not limited to at least one of a current magnitude (namely, a valid current value), an amplitude of a current pulse (namely, a current peak value), a pulse width of the current pulse, and a leakage current. For example, the voltage data includes but is not limited to at least one of a voltage magnitude (namely, a valid voltage value), an amplitude of a voltage pulse (namely, a voltage peak value), and a pulse width of the voltage pulse. For example, the element attribute data is element-specific attribute data. The elements are different, and in this case, element attribute data may also be different. The element attribute data is not limited herein. Certainly, the foregoing feature data is merely an example. The feature data is not limited in this embodiment.

It should be understood that the reference data matches the feature data. In other words, the reference data and the feature data belong to a same type of data. For example, if the feature data includes the leakage current and the element attribute data, the reference data includes a reference leakage current and reference element attribute data. For another example, if the feature data is the temperature data, the reference data is reference temperature data. In some implementations, the difference threshold may be a quantity threshold. If a quantity of pieces of data that is in the feature data and that is different from the reference data is less than or equal to the quantity threshold, the second identifier indicating that no fault exists is generated. If a quantity of pieces of data that is in the feature data and that is different from the reference data is greater than the quantity threshold, the second identifier indicating that the fault exists is generated.

Refer to the storage apparatus shown in FIG. 5. The storage medium includes a sensor. The sensor obtains, through detection, data generated by each element included in the storage medium, and sends the detected data to the comparator. Then, the comparator obtains the feature data based on the data detected by the sensor, and the comparator further obtains the reference data from the volatile storage unit. Then, the comparator compares the feature data with the reference data, generates the second identifier, and sends the second identifier to the I/O circuit interface. For example, the reference data may be stored in the volatile storage unit in a form of an abnormal table, and the abnormal table may be generated in a production process of the storage medium.

Figure 7:
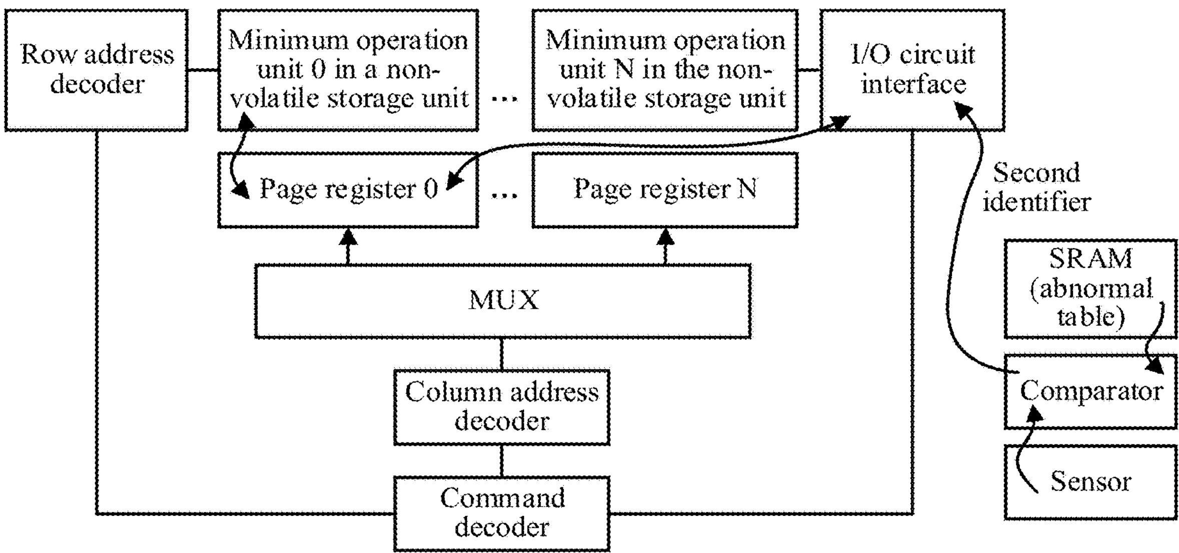
FIG. 7 is a schematic flowchart of generating a second identifier according to an embodiment.

For example, FIG. 7 is a schematic flowchart of generating a second identifier. In an aspect, service data is exchanged between a minimum operation unit 0 in a non-volatile storage unit, a page register 0, and an I/O circuit interface. In another aspect, a comparator uses data detected by a sensor as feature data, obtains an abnormal table from an SRAM as reference data, generates a second identifier by comparing the feature data with the reference data, and sends the second identifier to the I/O circuit interface.

Obtaining manner 2: The manner is applicable to a case in which the data processing instruction instructs to read the service data, in other words, is used to determine whether the data read process is faulty. The storage medium obtains, in the execution process of the data processing instruction, the feature data based on the read service data.

Because the data processing instruction instructs to read the service data, the storage medium can read the service data by executing the data processing instruction, and therefore obtain the feature data based on the read service data. For example, the feature data is the read service data. The read service data is processed in a second processing manner, to obtain the feature data. In some implementations, the second processing manner includes extracting a parity bit, calculation, and the like. This is not limited herein.

For example, when the second processing manner is extracting a parity bit, the feature data is a parity bit extracted from the read service data, and the parity bit is written into the storage medium together with the service data. The reference data is a quantity of odd numbers or a quantity of even numbers. In some implementations, the difference threshold may be zero. If a quantity of parity bits is the same as the reference data, it indicates that the difference between the feature data and the reference data is equal to the difference threshold, and the second identifier indicating that no fault exists is generated. If a quantity of parity bits is different from the reference data, it indicates that the difference between the feature data and the reference data is greater than the difference threshold, and the second identifier indicating that the fault exists is generated. For example, the reference data is the quantity of odd numbers. If the quantity of parity bits is also the quantity of odd numbers, the quantity of parity bits is the same as the reference data. If the quantity of parity bits is the quantity of even numbers, the quantity of parity bits is different from the reference data. This manner is also referred to as parity check.

Refer to the storage apparatus shown in FIG. 5. It can be learned from the descriptions in step 602 that, in the data read process, data stored in the non-volatile storage unit is written into the volatile storage unit for caching. In this case, the comparator reads the service data from the volatile storage unit, and obtains the feature data based on the read service data. The comparator further obtains the reference data from the volatile storage unit. Then, the comparator compares the feature data with the reference data, generates the second identifier, and sends the second identifier to the I/O circuit interface.

Figure 8:
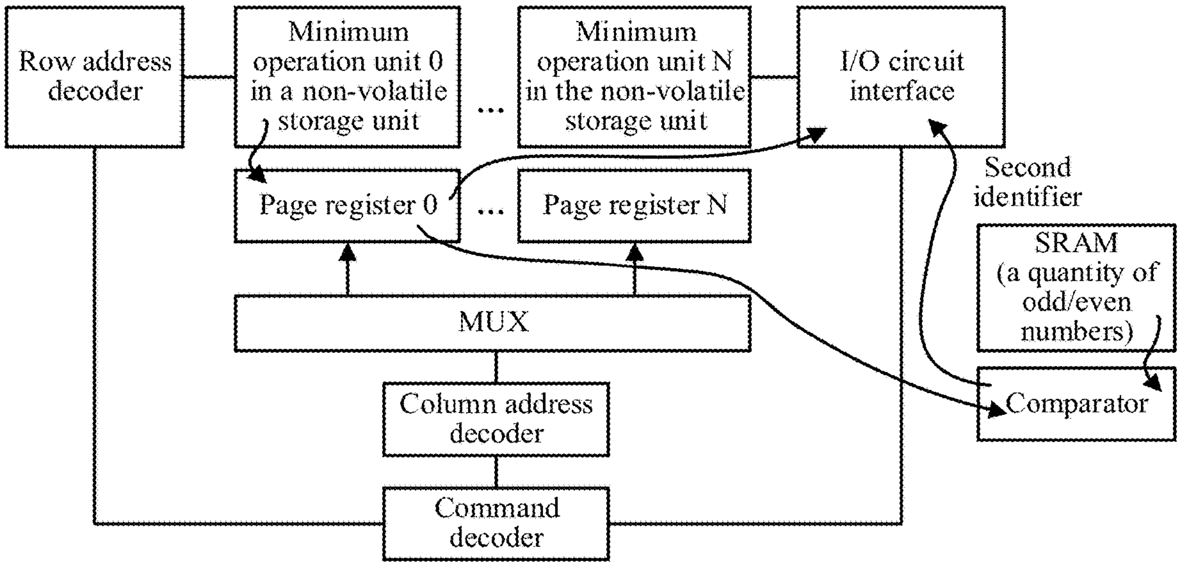
FIG. 8 is another schematic flowchart of generating a second identifier according to an embodiment.

For example, FIG. 8 is a schematic flowchart of generating a second identifier. In an aspect, a minimum operation unit 0 in a non-volatile storage unit writes service data into a page register 0 for caching, and an I/O circuit interface reads the service data from the page register 0. In another aspect, the comparator obtains the cached service data from the page register 0, extracts the cached service data to obtain a parity bit, and uses the parity bit as feature data. The comparator further obtains a quantity of odd numbers or a quantity of even numbers from an SRAM as reference data, compares the feature data with the reference data (in other words, the comparator performs parity check), generates a second identifier, and sends the second identifier to the I/O circuit interface.

Obtaining manner 3: The manner is applicable to a case in which the data processing instruction instructs to write the service data, in other words, is used to determine whether the data write process is faulty. The storage medium reads the written service data in the execution process of the data processing instruction, and obtains the feature data based on the read service data.

Because the data processing instruction instructs to write the service data, the storage medium can write the service data into the storage medium by executing the data processing instruction. Then, the storage medium reads the written service data, and therefore obtains the feature data based on the read service data. For example, the feature data is the read service data. Alternatively, the read service data is processed in a third processing manner, to obtain the feature data. In some implementations, the third processing manner includes calculation. This is not limited herein.

In addition, the reference data matches the feature data. For example, the reference data is data that needs to be written and that is received by the storage medium from the controller. For example, the difference threshold may be a specified bit greater than or equal to zero. When the difference between the feature data and the reference data is less than or equal to the specified bit, the second identifier indicating that no fault exists is generated. When the difference between the feature data and the reference data is greater than the specified bit, the second identifier indicating that the fault exists is generated.

In some implementations, a difference between a moment at which the service data is written into the storage medium and a moment at which the written service data is read should be less than or equal to a time threshold. In other words, after being written into the storage medium, the written service data is read in a short period of time. Therefore, impact on the written service data caused by a change of a property of the storage medium can be avoided, and it is ensured that the read service data is the same as the written service data. Because the feature data is obtained based on the read service data, when the read service data is the same as the written service data, determining, by using the feature data, whether the data writing process is faulty has high accuracy. The time threshold is not limited in this embodiment, and the time threshold may be set based on experience or an actual requirement.

Refer to the storage apparatus shown in FIG. 5. It can be learned from the descriptions in step 602 that, in the data writing process, the I/O circuit interface writes the service data into the volatile storage unit for caching, and then the non-volatile storage unit reads the cached service data from the volatile storage unit and stores the cached service data. In this case, the comparator reads the stored service data from the non-volatile storage unit, and obtains the feature data based on the read service data. The comparator further reads the cached service data from the volatile storage unit as the reference data. Then, the comparator compares the feature data with the reference data, generates the second identifier, and sends the second identifier to the I/O circuit interface.

Figure 9:
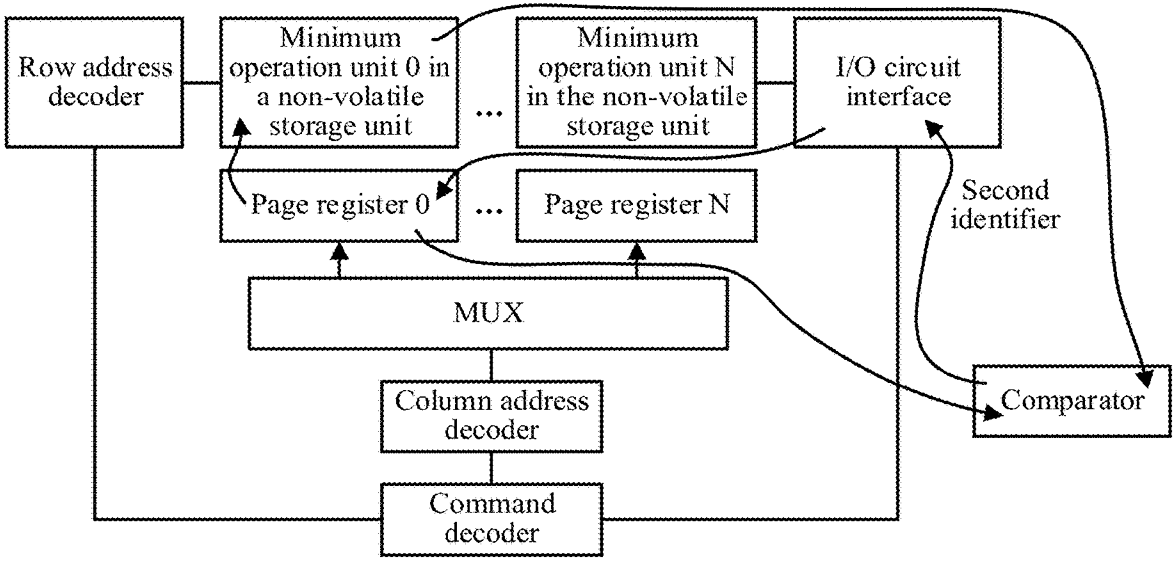
FIG. 9 is still another schematic flowchart of generating a second identifier according to an embodiment.

For example, FIG. 9 is a schematic flowchart of generating a second identifier. In an aspect, an I/O circuit interface writes service data into a page register 0 for caching, and a minimum operation unit 0 in a non-volatile storage unit reads the service data from the page register 0 and stores the service data. In another aspect, a comparator uses the service data read from the minimum operation unit 0 in the non-volatile storage unit as feature data, and uses the cached service data read from the page register 0 as reference data, and therefore compares the feature data with the reference data, and generates a second identifier, and sends the second identifier to the I/O circuit interface.

It should be noted that Obtaining manner 1 may be combined with Obtaining manner 2 or Obtaining manner 3. For example, when the data processing instruction is a data read instruction, the second identifier may be generated in Obtaining manner 1 and Obtaining manner 2. For example, if the difference between the feature data obtained in Obtaining manner 1 and the reference data is less than the difference threshold, and/or the difference between the feature data obtained in Obtaining manner 2 and the reference data is less than the difference threshold, the second identifier indicating that no fault exists is generated. For another example, when the data processing instruction is a data write instruction, the second identifier may be generated in Obtaining manner 1 and Obtaining manner 3. For example, if the difference between the feature data obtained in Obtaining manner 1 and the reference data is less than the difference threshold, and/or the difference between the feature data obtained in Obtaining manner 3 and the reference data is less than the difference threshold, the second identifier indicating that no fault exists is generated.

The foregoing separately describes the first identifier and the second identifier. The foregoing-described manner is merely an example, and does not constitute limitations on the first identifier and the second identifier. Regardless of a first identifier and a second identifier are used by the storage medium, the target identifier can be obtained, and the storage medium sends the target identifier to the controller after executing the data processing instruction. If the controller sends only one data processing instruction to the storage medium, the storage medium sends only one target identifier corresponding to the data processing instruction to the controller. If the controller sends two or more data processing instructions to the storage medium, the storage medium separately sends a target identifier corresponding to each data processing instruction to the controller.

Step 604: The controller confirms, based on the target identifier, that the storage medium has executed the data processing instruction.

After the storage medium sends the target identifier to the controller, the controller receives the target identifier. The target identifier is at least one of the first identifier and the second identifier. The controller may confirm, based on the target identifier, the data processing instruction corresponding to the target identifier, to confirm that the storage medium has executed the data processing instruction corresponding to the target identifier.

When the target identifier includes only the first identifier, because the first identifier indicates the data processing instruction, the controller may determine the data processing instruction corresponding to the first identifier. In some implementations, a type of the first identifier is Type 1 described in step 603. The first identifier is the third identifier sent by the controller to the storage medium, and the controller stores the first correspondence between the third identifier and the data processing instruction. In this case, the controller may query the first correspondence based on the received first identifier, to confirm the data processing instruction corresponding to the first identifier. In some other implementations, a type of the first identifier is Type 2 described in step 603. The first identifier includes the at least one of the identifier of the storage unit and the identifier of the storage medium, and the controller stores the second correspondence between the reference identifier and the data processing instruction. In this case, the controller queries the second correspondence based on the received first identifier, and uses a data processing instruction corresponding to a hit reference identifier as the data processing instruction corresponding to the first identifier, and therefore confirms the data processing instruction corresponding to the first identifier.

Alternatively, for example, when the target identifier includes only the second identifier, because the second identifier only indicates the fault status, and does not indicate a fault status corresponding to a specific data processing instruction, the controller can determine, based on the second identifier, the data processing instruction corresponding to the second identifier when the controller sends only one data processing instruction to the storage medium, in other words, when the storage medium returns only one target identifier to the controller. The data processing instruction corresponding to the second identifier is the one data processing instruction sent by the controller.

It should be understood that when the controller needs to send at least two data processing instructions to the storage medium, in other words, the storage medium returns at least two target identifiers to the controller, the controller can further perform identification on a data processing instruction corresponding to each target identifier, so that the target identifier may include only the first identifier, or include the first identifier and the second identifier. In this case, the controller may identify, based on the first identifier and the foregoing descriptions, the data processing instruction corresponding to each target identifier. Details are not described herein again.

In a technology, after sending a data processing instruction to a storage medium, a controller waits for fixed duration, and then considers by default that the storage medium has executed the data processing instruction. However, actual time consumed by the storage medium to execute the data processing instruction may be less than or greater than the fixed duration. If the actual consumed time is less than the fixed duration, the controller waits for extra duration. Consequently, data processing efficiency is low. If the actual consumed time is greater than the fixed duration, after the controller waits for the fixed duration and considers by default that the storage medium has executed the data processing instruction, the storage medium has not executed the data processing instruction or has not completed execution of the data processing instruction. Consequently, data processing reliability is low. It can be learned that a data processing process in the technology is not flexible enough.

In comparison with the technology, after executing the data processing instruction, the storage medium in this embodiment returns the target identifier to the controller, and the controller confirms, based on the target identifier, that the storage medium has executed the data processing instruction. In other words, after receiving the target identifier, the controller may confirm, that the storage medium has completed the execution of the data processing instruction. If actual consumed time is less than the foregoing fixed duration, the controller receives the target identifier before the fixed duration is reached. In this case, the controller may confirm, based on the target identifier, that the storage medium has completed the execution of the data processing instruction, and does not need to wait for extra duration. Therefore, data processing efficiency is improved. If actual consumed time is greater than the foregoing fixed duration, after receiving the data processing instruction, the controller confirms that the storage medium has completed the execution of the data processing instruction. This avoids a case in which the storage medium has not executed the data processing instruction or has not completed the execution of the data processing instruction. Therefore, data processing reliability is improved. It can be learned that the data processing method provided in this embodiment is flexible.

In an example embodiment, the data processing instruction instructs to write the service data. The storage medium is configured to store the service data in a non-volatile storage, in other words, the storage medium stores the service data by using the non-volatile storage unit. The method further includes: The controller deletes service data in a volatile storage based on the target identifier. After receiving the target identifier, the controller confirms that the storage medium has executed the data processing instruction. Therefore, for the controller, the storage medium stores the service data in the non-volatile storage. In this case, the service data does not need to be stored in the volatile storage. Therefore, the controller may delete the service data in the volatile storage based on the target identifier. In other words, the service data is no longer cached via the volatile storage unit included in the storage medium. Therefore, storage space of the volatile storage unit is released, and redundant occupation of the storage space is avoided.

It should be noted that, in addition to being used by the controller to confirm that the storage medium has executed the data processing instruction, the first identifier and the second identifier each have other functions. Descriptions are provided below separately.

For the first identifier, when the controller sends a plurality of data processing instructions that instruct to read the service data, in other words, sends a plurality of data read instructions, the storage medium may send, to the controller, a first identifier and read service data that correspond to each other. The controller may determine, based on the first identifier, a data read instruction corresponding to the received service data. Therefore, regardless of a sequence in which the controller sends the plurality of data read instructions, and regardless of time at which the storage medium sends the read service data to the controller and a sequence in which the storage medium sends the read service data to the controller, the controller can identify the data read instruction corresponding to the received service data. Therefore, the controller does not need to schedule the sending sequence of the plurality of data read instructions, and does not need to command the storage medium to return the read service data at specified time and in a specified sequence. Therefore, design complexity of the controller can be simplified. In addition, because the storage medium does not need to return the read service data at the specified time and in the specified sequence, the storage medium does not need to precisely control time consumed for executing each data read instruction. In other words, the storage medium does not need to ensure delay consistency in a life periodicity. The delay consistency includes delay consistency of one storage medium and delay consistency between different storage media.

In an example embodiment, the data processing instruction instructs to read the service data. The method further includes: The storage medium sends the read service data to the controller. A sending path of the read service data is different from that of the first identifier. The controller receives the read service data and the first identifier on different sending paths, and determines a priority of the read service data based on the first identifier. In response to that the priority of the read service data is higher than a priority of other data currently processed by the controller, the controller is further configured to: interrupt a processing process of the other data, and process the read service data.

In other words, the storage medium separately sends the read service data and the first identifier to the controller by using different signal cables. If the storage medium further sends the second identifier, a signal cable used for sending the second identifier is not limited. After receiving the service data and the first identifier by using different signal cables, the controller may determine the priority of the service data based on the first identifier. When the priority of the service data is higher than the priority of the other data currently processed by the controller, the controller may interrupt processing of the other data, and process the read service data. For example, after processing of the read service data is completed, the controller resumes the processing of the other data. For example, the controller interrupts a process of sending the other data to a processor, and sends the read service data to the processor. After the read service data is successfully sent to the processor, the controller continues to send the other data to the processor.

In some implementations, the type of the first identifier is Type 1 described in step 603. The first identifier is the third identifier sent by the controller to the storage medium, and the controller stores the first correspondence between the third identifier and the data processing instruction. In this case, the controller may use, based on the first identifier, a priority of the data processing instruction corresponding to the first identifier as the priority of the read service data. The priority of the data processing instruction may be set by the controller, or may be determined by the controller in another manner. This is not limited herein.

In some other implementations, the type of the first identifier is Type 2 described in step 603. The first identifier includes the at least one of the identifier of the storage unit and the identifier of the storage medium. In this case, the controller may use at least one of a priority of the storage unit and a priority of the storage medium as the priority of the read service data. The priority of the storage unit and the priority of the storage medium may be flexibly set based on actual requirements. This is not limited herein.

For the second identifier, because the second identifier indicates the fault status, the controller may learn, based on the second identifier, whether the data processing instruction is faulty. If the data processing instruction is not faulty, the controller may continue to perform another operation. For example, when the data processing instruction instructs to write the service data, and the storage medium is configured to store the service data in the non-volatile storage, if the second identifier indicates that the data processing instruction is not faulty, the controller may confirm that the storage medium securely stores the service data in the non-volatile storage, so that the service data in the volatile storage can be deleted. If the data processing instruction is faulty, the controller may take a corresponding measure in time, to avoid an error or a loss of the service data. Therefore, reliability of the data processing process is ensured.

In some implementations, the data processing instruction instructs to read the service data. The method further includes: In response to that the fault status indicated by the second identifier is that the fault exists, the controller performs an error correction process, to recover the service data. Because the fault status indicated by the second identifier is that the fault exists, the controller can confirm that the service data read process is faulty. Therefore, the error correction process needs to be performed to recover the service data. Therefore, the error of the service data is avoided, and the reliability of the data processing process is ensured.

For example, the error correction process includes but is not limited to manners such as error checking and correcting (ECC) coding, and the like. The error correction process is not limited in this embodiment.

In some other implementations, the data processing instruction instructs to write the service data. The data processing instruction corresponds to a first storage unit. In other words, the address corresponding to the data processing instruction is an address in the first storage unit. Therefore, the storage medium writes the service data into the first storage unit based on the data processing instruction. Correspondingly, the method further includes: In response to that the fault status indicated by the second identifier is that the fault exists, the controller sends an updated data processing instruction to the storage medium. The updated data processing instruction instructs to write the service data into a second storage unit. The first storage unit and the second storage unit are different storage units included in the storage medium. The storage medium executes the updated data processing instruction.

In other words, when the fault status indicated by the second identifier is that the fault exists, the controller may confirm that the current data write process is faulty. The controller confirms that the current data write process is faulty without waiting for the next time to read the current data. Therefore, the controller updates a storage unit used to store the service data from the first storage unit to the different second storage unit. The controller indicates, by sending the updated data processing instruction to the storage medium, the storage medium to write the service data into the second storage unit. Therefore, the service data can be securely stored in the second storage unit. This avoids the loss of the service data and ensures the data processing reliability. In addition, for a manner in which the controller sends the updated data processing instruction to the storage medium, refer to the descriptions in step 601 and step 603. For a manner in which the storage medium executes the updated data processing instruction, refer to the manner in which the storage medium executes the data processing instruction described in step 602. Details are not described herein again.

In some implementations, the controller further updates an address mapping relationship. The address mapping relationship includes a mapping relationship between the service data and an address. Before the controller updates the address mapping relationship, the address mapping relationship includes a mapping relationship between the service data and an address of the first storage unit. After the controller updates the address mapping relationship, an address mapping relationship includes a mapping relationship between the service data and an address of the second storage unit.

In an example embodiment, the controller is further configured to mark the first storage unit as an unreliable storage unit. It should be noted that marking the first storage unit as the unreliable storage unit does not necessarily indicate that the first storage unit is no longer used, but the first storage unit may continue to be used after the marking. Therefore, a waste of storage space (to be specific, storage space corresponding to the first storage unit) in the storage medium is avoided.

In some implementations, the controller stores a third correspondence between each storage unit included in the storage medium and a state. Before the controller receives the second identifier indicating that the fault exists, each storage unit corresponds to a reliable state. After receiving the second identifier indicating that the fault exists, the controller updates, in the third correspondence, a state of a storage unit used to execute a data processing instruction corresponding to the second identifier, that is, a state of the first storage unit, from a reliable state to an unreliable state, to mark the first storage unit as the unreliable storage unit.

In addition, for example, the method further includes: The controller protects the first storage unit marked as the unreliable storage unit. For example, a protection manner includes but is not limited to at least one of mirror protection, enhanced ECC coding protection, and multi-level ECC coding protection. The protection manner is not limited herein.

In an example embodiment, the method further includes: After marking the first storage unit as the unreliable storage unit, in response to that a quantity of times for which an error occurs in the first storage unit is greater than or equal to a threshold of the quantity of times, the controller marks the first storage unit as a damaged storage unit, and stops using the first storage unit. When the quantity of times for which the error occurs in the unreliable first storage unit is large, if the first storage unit is continuously used, security of the service data may be affected. In this case, the controller stops using the first storage unit. The threshold of the quantity of times is not limited in this embodiment.

In some implementations, when the controller stores the third correspondence, in response to that the quantity of times for which the error occurs in the first storage unit is greater than or equal to the threshold of the quantity of times, the controller may update, in the third correspondence, the state of the first storage unit from the unreliable state to a damaged state, to mark the first storage unit as the damaged storage unit.

It should be understood that the unreliable state and damaged state are merely examples. For example, the controller may further mark the first storage unit as a plurality of other states based on the quantity of times for which the error occurs in the first storage unit. Each state may correspond to a different measure. The plurality of other states and corresponding measures are not limited herein.

In conclusion, after completing the execution of the data processing instruction sent by the controller, the storage medium in this embodiment returns the target identifier to the controller. In this case, after receiving the target identifier, the controller may confirm that the storage medium has executed the data processing instruction. In this way, the controller does not need to consider by default, after waiting for fixed duration, that the storage medium has executed the data processing instruction. Therefore, efficiency and reliability of the data processing process are considered, and flexibility of the data processing process is improved.

The target identifier is at least one of the first identifier and the second identifier, the first identifier indicates the data processing instruction, and the second identifier indicates the fault status. When there is one data processing instruction, the target identifier is only the first identifier, is only the second identifier, or is the first identifier and the second identifier. In this case, the controller can identify, based on the target identifier, the data processing instruction executed by the storage medium. When there are at least two data processing instructions, the target identifier is only the first identifier, or is the first identifier and the second identifier. In this case, the controller can identify, based on the target identifier, the data processing instruction executed by the storage medium.

In addition to being used by the controller to confirm that the storage medium has executed the data processing instruction, the first identifier may be further used by the controller to perform identification on, when the data processing instruction is a data read instruction, a data read instruction corresponding to the service data returned by the storage medium. Therefore, the controller does not need to schedule the sending sequence of the data read instruction, and does not need to command the storage medium to return the service data at the specified time and in the specified sequence. Therefore, design complexity of the controller can be simplified. In addition, because the storage medium does not need to return the service data at the specified time and in the specified sequence, the storage medium does not need to control the time consumed for executing each data read instruction. In other words, the storage medium does not need to ensure the delay consistency in the life periodicity. In addition to being used by the controller to confirm that the storage medium has executed the data processing instruction, the second identifier may be further used by the controller to confirm in time whether the execution process of the data processing instruction is faulty.

Next, an example in which the target identifier includes the first identifier and the second identifier is used to compare the data processing method provided in embodiments with the data processing process in the technology, and describe the data processing method provided in this embodiment.

Figure 10:
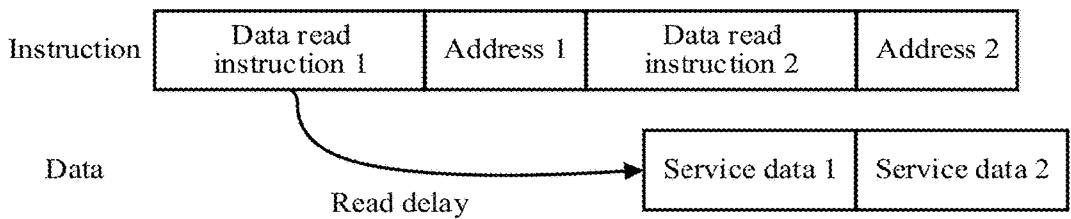
FIG. 10 is a schematic diagram of a data read process in a technology according to an embodiment.

FIG. 10 is a schematic diagram of a data read process in a technology. The controller sequentially sends a data read instruction 1, an address 1 corresponding to the data read instruction 1, a data read instruction 2, and an address 2 corresponding to the data read instruction 2 to the storage medium. Then, the storage medium needs to ensure delay consistency of the storage medium, to sequentially return service data 1 corresponding to the data read instruction 1 and service data 2 corresponding to the data read instruction 2. Therefore, that the controller identifies a data read instruction respectively corresponding to received service data can be ensured. Correspondingly, after waiting for fixed duration, the controller reads the service data 1 and the service data 2 by default and performs identification. In addition, before performing error correction, the controller cannot determine whether the storage medium successfully executes the data read instruction 1 and the data read instruction 2.

Figure 11:
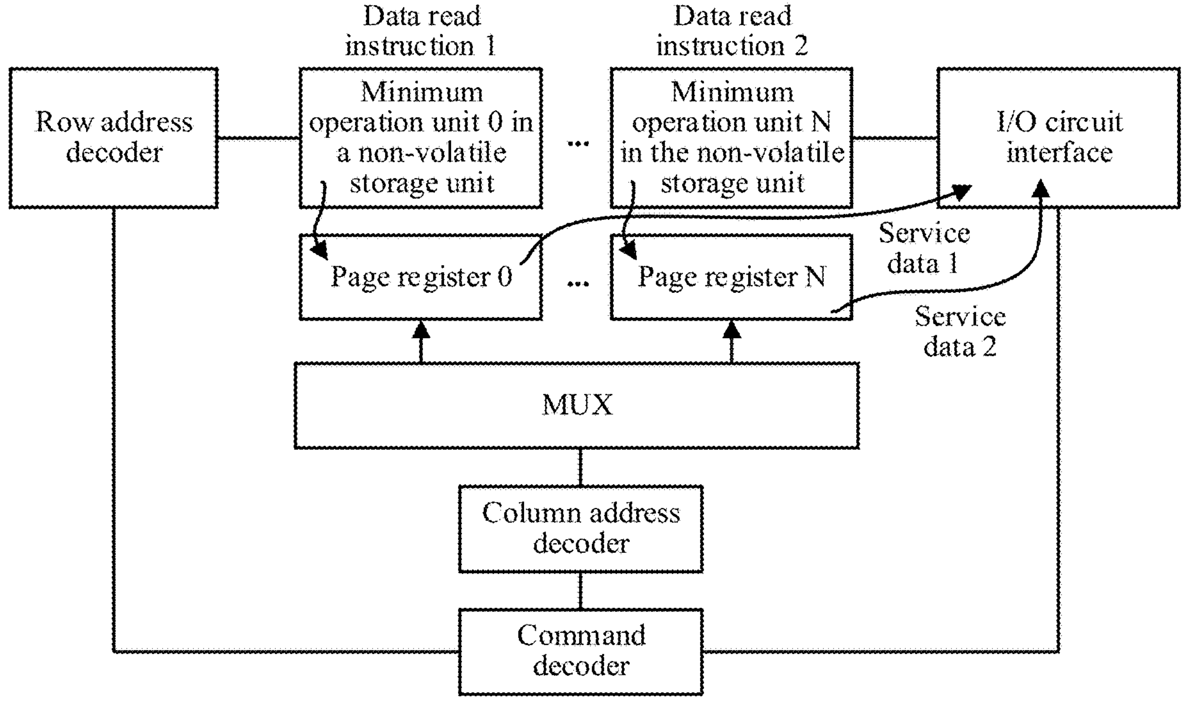
FIG. 11 is a schematic diagram of a data read process according to an embodiment.
Figure 12:
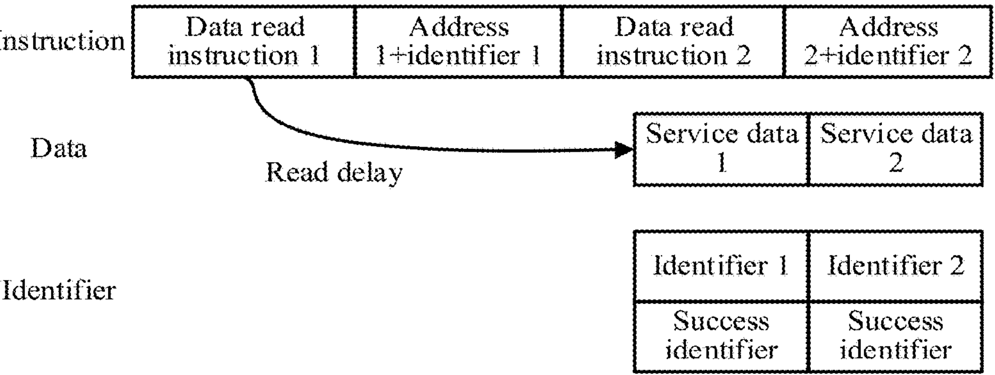
FIG. 12 is a schematic diagram of another data read process according to an embodiment.
Figure 13:
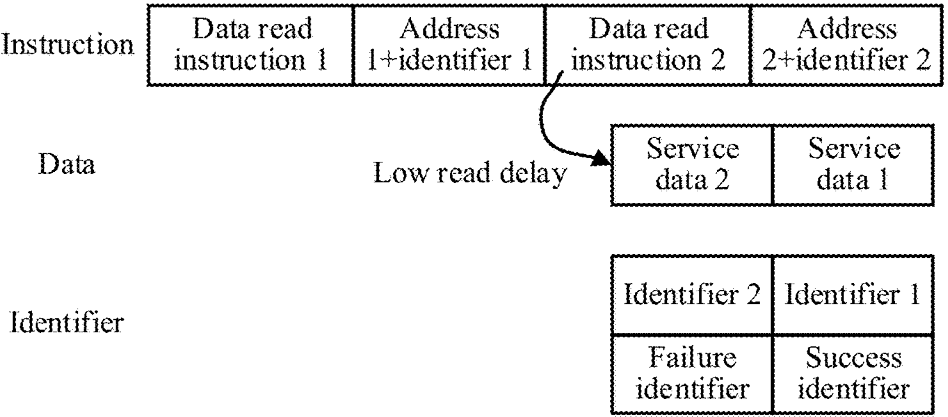
FIG. 13 is a schematic diagram of still another data read process according to an embodiment.

For a case in which data is read by using the data processing method provided in embodiments, refer to FIG. 11. FIG. 11 shows a case in which different minimum operation units in a non-volatile storage unit execute data read instructions in parallel. The storage medium uses a minimum operation unit 0 in the non-volatile storage unit execute a data read instruction 1, and uses a minimum operation unit N in the non-volatile storage unit to execute a data read instruction 2. Refer to FIG. 12 and FIG. 13. The controller sequentially sends a data read instruction 1, an address 1 and an identifier 1 (corresponding to the third identifier described above) that correspond to the data read instruction 1, a data read instruction 2, and an address 2 and an identifier 2 (corresponding to the third identifier described above) that correspond to the data read instruction 2 to the storage medium.

For a case in which both the data read instruction 1 and the data read instruction 2 are successfully executed, refer to FIG. 12. The storage medium sends, to the controller in one transmission periodicity by using different signal cables, service data 1 read based on the data read instruction 1, the identifier 1 (corresponding to the first identifier described above) corresponding to the data read instruction 1, and a success identifier (corresponding to the second identifier described above) indicating that no fault exists. The storage medium sends, to the controller in another transmission periodicity by using different signal cables, service data 2 read based on the data read instruction 2, the identifier 2 (corresponding to the first identifier described above) corresponding to the data read instruction 2, and a success identifier (corresponding to the second identifier described above) indicating that no fault exists. After performing receiving, the controller confirms, based on the identifier 1 and the success identifier, that the service data 1 is service data read based on the data read instruction 1, and the data read instruction 1 is successfully executed. The controller further confirms, based on the identifier 2 and the success identifier, that the service data 2 is service data read based on the data read instruction 2, and the data read instruction 2 is successfully executed.

It should be noted that, in a case shown in FIG. 12, the service data 1, the identifier 1, and the success identifier are first sent, and then the service data 2, the identifier 2, and the success identifier are sent. Actually, the service data 2, the identifier 2, and the success identifier may alternatively be sent first, and then the service data 1, the identifier 1, and the success identifier are sent. Regardless of a sequence that is used, the controller can identify data read instructions corresponding to the service data 1 and the service data 2.

For a case in which the data read instruction 1 is successfully executed and the data read instruction 2 fails to be executed, refer to FIG. 13. Service data 2 read based on the data read instruction 2 is unreliable data, and a read delay of executing the data read instruction 2 is low. In this case, the service data 2 may be returned first. Therefore, the storage medium first sends, to the controller in one transmission periodicity by using different signal cables, the service data 2, the identifier 2, and a failure identifier (corresponding to the second identifier described above) indicating that a fault exists. Then, the storage medium sends service data 1, the identifier 1, and a success identifier to the controller in another transmission periodicity by using different signal cables. The controller first receives the service data 2, the identifier 2, and the failure identifier, to determine, based on the identifier 2 and the failure identifier, that the service data 2 is service data read based on the data read instruction 2, and the data read instruction 2 fails to be executed. Then, the controller receives the service data 1, the identifier 1, and the success identifier, and confirms, based on the identifier 1 and the success identifier, that the service data 1 is service data read based on the data read instruction 1, and the data read instruction 1 is successfully executed.

Figure 14:
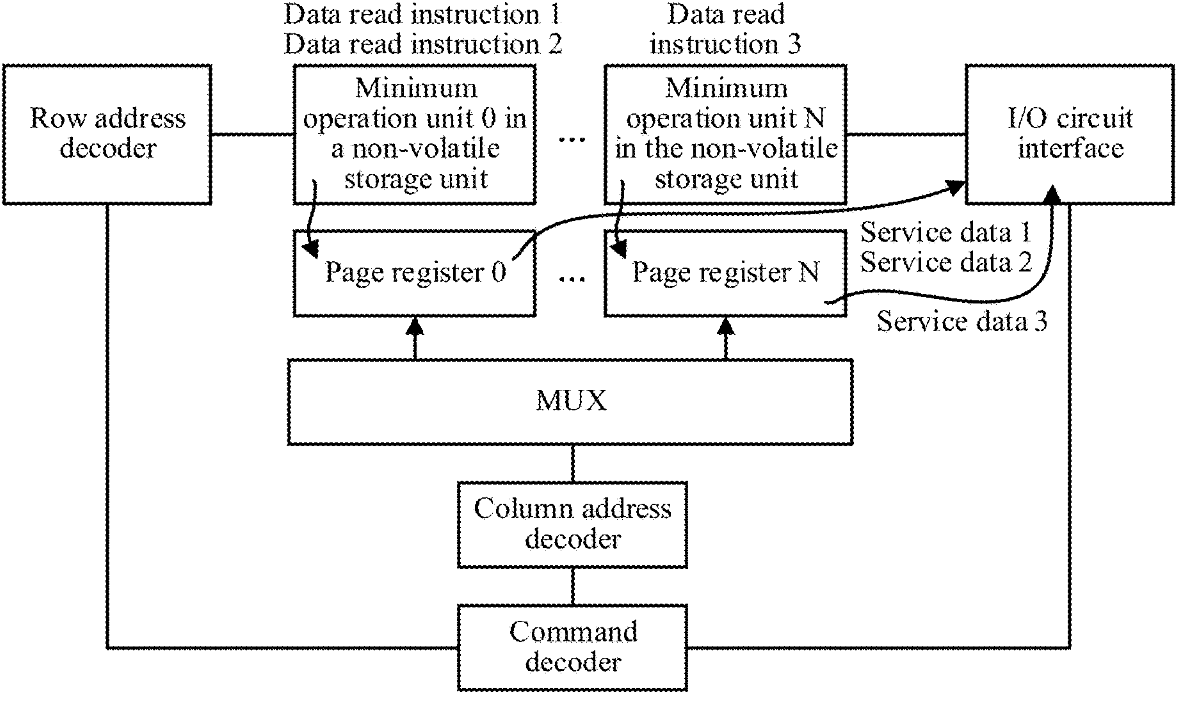
FIG. 14 is a schematic diagram of yet another data read process according to an embodiment.

Alternatively, for a case in which data is read by using the data processing method provided in embodiments, refer to FIG. 14. FIG. 14 shows a case in which different minimum operation units in a non-volatile storage unit execute data read instructions in parallel, and a same minimum operation unit executes data read instructions in serial. The storage medium needs to use a minimum operation unit 0 in the non-volatile storage unit to execute a data read instruction 1 and a data read instruction 2, and use a minimum operation unit N in the non-volatile storage unit to execute a data read instruction 3. For the data read instruction 1 and the data read instruction 2, the same minimum operation unit 0 is used. Therefore, the data read instruction 1 and the data read instruction 2 need to be executed in serial. For the data read instruction 3, another minimum operation unit N is used. Therefore, the data read instruction 3 can be executed in parallel with a data processing instruction 1 (or a data processing instruction 2). The controller sequentially sends the data read instruction 1, an address 1, and an identifier 1, the data read instruction 2, an address 2, and an identifier 2, and the data read instruction 3, an address 3, and an identifier 3 to the storage medium.

For example, the storage medium first executes the data read instruction 1 and the data read instruction 3 in parallel, and then executes the data read instruction 2 in serial, and all the three data read instructions are successfully executed. First, the storage medium may return service data 1, the identifier 1, and a success identifier to the controller. The controller identifies that the service data 1 corresponds to the data read instruction 1, and the data read instruction 1 is successfully executed. Then, the storage medium returns service data 3, the identifier 3, and a success identifier to the controller. The controller identifies that the service data 3 corresponds to the data read instruction 3, and the data read instruction 3 is successfully executed. Next, the storage medium returns service data 2, the identifier 2, and a success identifier to the controller. The controller identifies that the service data 3 corresponds to the data read instruction 3, and the data read instruction 3 is successfully executed.

It should be noted that, if the case shown in FIG. 14 is applied to the technology, the controller sequentially sends the data read instruction 1 and the address 1, the data read instruction 2 and the address 2, and the data read instruction 3 and the address 3 to the storage medium, and considers by default that the data returned by the storage medium is sequentially the service data 1, the service data 2, and the service data 3. A data returning sequence is the same as a sequence of sending the data read instructions by the controller to the storage medium. However, actually, the data returned by the storage medium is sequentially the service data 1, the service data 3, and the service data 2. An actual data returning sequence is different from the default sequence of the controller. Consequently, the controller cannot identify each piece of service data. In addition, the controller cannot determine whether the storage medium successfully executes each data read instruction 1.

Figure 15:
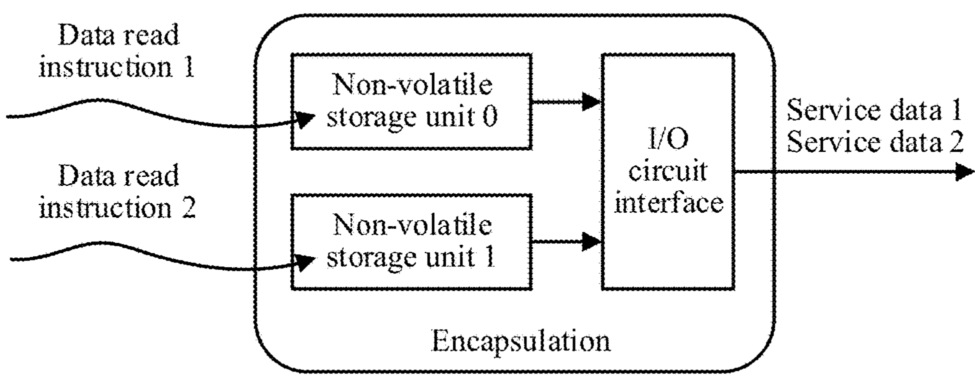
FIG. 15 is a schematic diagram of still yet another data read process according to an embodiment.

Alternatively, for a case in which data is read by using the data processing method provided in embodiments, refer to FIG. 15. FIG. 15 shows a case in which two non-volatile storage units coexist and share a same I/O circuit interface. The controller sends a data read instruction 1, an address 1, and an identifier 1 to a non-volatile storage unit 0. The non-volatile storage unit 0 returns service data 1, the identifier 1, and a success identifier to the controller. The controller identifies that the service data 1 is service data corresponding to the data read instruction 1, and the data read instruction 1 is successfully executed. The controller further sends a data read instruction 2, an address 2, and an identifier 2 to a non-volatile storage unit 1. The storage medium 1 returns service data 2, the identifier 2, and a success identifier to the controller. The controller identifies that the service data 2 is service data corresponding to the data read instruction 2, and the data read instruction 2 is successfully executed. The non-volatile storage unit 0 and the non-volatile storage unit 1 do not need to ensure delay consistency, and only need to execute corresponding data read instructions based on respective delays. In a case in which the non-volatile storage unit 0 first returns the service data 1, and then the non-volatile storage unit 1 returns the service data 2, or a case in which the non-volatile storage unit 1 first returns the service data 2, and then the non-volatile storage unit 0 returns the service data 1, the controller can identify data read instructions corresponding to the service data 1 and the service data 2. In addition, the two non-volatile storage units shown in FIG. 15 are merely examples, and there may be three or more non-volatile storage units.

Figure 16:
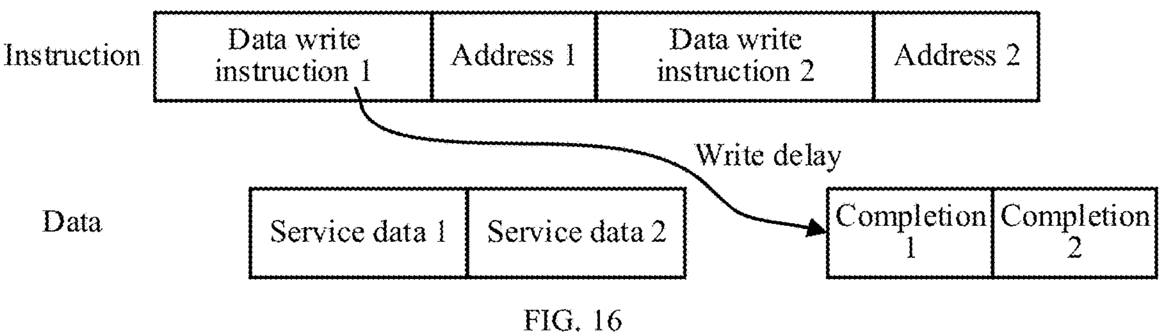
FIG. 16 is a schematic diagram of a data write process in a technology according to an embodiment.

FIG. 16 is a schematic diagram of a data write process in a technology. The controller sequentially sends a data write instruction 1, an address 1 corresponding to the data write instruction 1, a data write instruction 2, and an address 2 corresponding to the data write instruction 2 to a storage medium. The controller further sequentially sends, to the storage medium, service data 1 and service data 2 that need to be written. Then, after waiting for fixed duration, the controller considers that both the data write instruction 1 and the data write instruction 2 have been executed. Refer to completion 1 and completion 2 shown in FIG. 16. The controller can determine whether the storage medium successfully executes the data write instruction 1 until the service data 1 is read next time (if the data write instruction 1 is successfully executed, the service data 1 can be normally read next time, or if the data write instruction 1 is not successfully executed, the service data 1 cannot be normally read next time). The controller can determine whether the storage medium successfully executes the data write instruction 2 only when the service data 2 is read next time.

Figure 17:
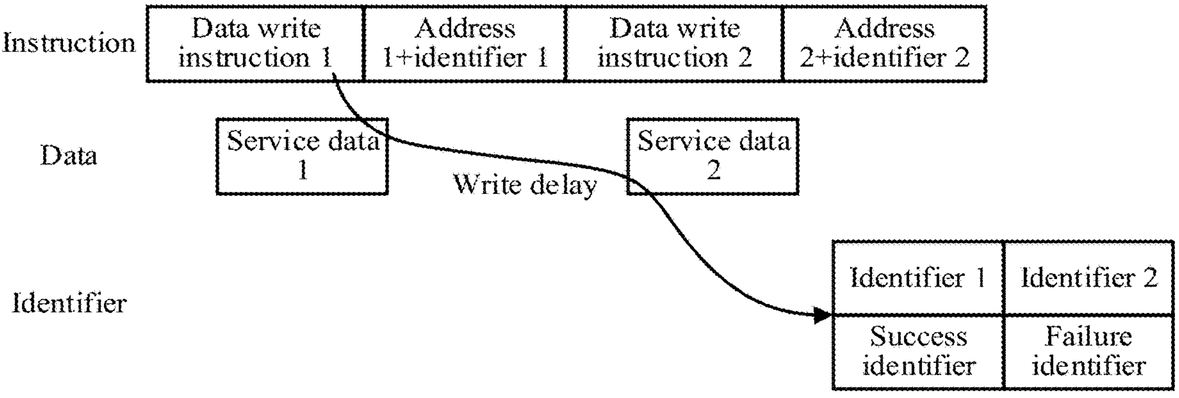
FIG. 17 is a schematic diagram of a data write process according to an embodiment.

For a case in which data is written by using the data processing method provided in embodiments, refer to FIG. 17. The controller sequentially sends a data write instruction 1, an address 1 and an identifier 1 (corresponding to the third identifier described above) that correspond to the data write instruction 1, a data write instruction 2, and an address 2 and an identifier 2 (corresponding to the third identifier described above) that correspond to the data write instruction 2 to a storage medium. The controller further sequentially sends service data 1 corresponding to the data write instruction 1 and service data 2 corresponding to the data write instruction 2 to the storage medium. Correspondingly, after successfully executing the data write instruction 1, the storage medium returns, to the controller, the identifier 1 and a success identifier indicating that no fault exists. After performing receiving, the controller may determine that the data write instruction 1 is successfully executed, and does not need to wait until the service data 1 is read next time to determine whether the data write instruction 1 is successfully executed. After successfully executing the data write instruction 2, the storage medium returns, to the controller, the identifier 2 and a failure identifier indicating that a fault exists. After performing receiving, the controller may determine that the data write instruction 2 fails to be executed, and does not need to wait until the service data 2 is read next time to determine whether the data write instruction 2 is successfully executed.

It should be noted that, in a case shown in FIG. 17, the identifier 1 and the success identifier are first sent, and then the identifier 2 and the failure identifier are sent. Actually, the identifier 2 and the failure identifier may alternatively be sent first, and then the identifier 1 and the success identifier are sent. Regardless of a sequence that is used, the controller can identify that the data read instruction 1 is successfully executed, and the data read instruction 2 fails to be executed.

The terms such as “first” and “second” are used to distinguish between same items or similar items whose effects and functions are basically the same. It should be understood that there is no logical or time-sequence dependency between “first”, “second”, and “nth”, and a quantity and an execution sequence are not limited. It should be further understood that although the terms such as first and second are used in the following descriptions to describe various elements, these elements should not be limited by the terms. These terms are simply used to distinguish one element from another element.

In embodiments, sequence numbers of the processes do not mean execution sequences. The execution sequences of the processes should be determined based on functions and internal logic of the processes, and should not be construed as any limitation on the implementation processes of embodiments.

The phrase “at least one” means one or more, and the phrase “a plurality of” means two or more. For example, a plurality of data processing instructions means two or more data processing instructions.

It should be understood that the terms used in the descriptions of the various examples in this specification are merely intended to describe specific examples and are not intended to impose a limitation. The terms “one” (“a” and “an”) and “the” of singular forms used in the descriptions of the various examples and the appended claims are also intended to include plural forms, unless otherwise specified in the context clearly.

It should be further understood that the term “and/or” used in this specification indicates and includes any or all possible combinations of one or more items in associated listed items. The term “and/or” describes an association relationship for describing associated objects and represents that three relationships may exist. For example, A and/or B may represent the following three cases: Only A exists, both A and B exist, and only B exists. In addition, the character “/” generally represents an “or” relationship between the associated objects.

It should be further understood that the terms “if” and “if” may be interpreted as a meaning of “when” (“when” or “upon”), “in response to determining”, or “in response to detecting”. Similarly, based on the context, the phrase “if it is determined that” or “if (a stated condition or event) is detected” may be interpreted as a meaning of “when it is determined that”, “in response to determining”, “when (a stated condition or event) is detected”, or “in response to detecting (a stated condition or event)”.

The foregoing descriptions are merely embodiments, but are not intended to limit this disclosure. Any modification, equivalent replacement, improvement, or the like made without departing from the principle of this disclosure should fall within the protection scope of this disclosure.

What is claimed is:

1. A storage apparatus comprising:
- a storage medium configured to:
  - receive a data processing instruction;
  - execute the data processing instruction, wherein the data processing instruction instructs to read service data;
  - obtaining feature data in an execution process of the data processing instruction;
  - perform a comparison of the feature data to reference data; and
  - send a target identifier, wherein the target identifier is a first identifier or a second identifier, wherein the first identifier indicates the data processing instruction, and wherein the second identifier indicates a fault status and is based on the comparison; and
- a controller configured to:
  - send the data processing instruction to the storage medium; and
  - confirm, based on the target identifier, that the storage medium has executed the data processing instruction.

2. The storage apparatus of claim 1, wherein the target identifier is the second identifier and corresponds to the data processing instruction.

3. The storage apparatus of claim 1, wherein the first identifier identifies a storage unit or the storage medium, wherein the storage unit is at least one of one or more storage units comprised in the storage medium, and wherein the storage unit is configured to be used in the execution process.

4. The storage apparatus of claim 1, wherein the storage medium is further configured to obtain, in the execution process, the feature data based on data from an element comprised in the storage medium.

5. The storage apparatus of claim 4, wherein the feature data comprise current data, voltage data, temperature data, or element attribute data.

6. The storage apparatus of claim 1, wherein the data processing instruction instructs to write service data, and wherein the storage medium is further configured to:

read the service data in the execution process; and obtain the feature data based on the read service data.

7. The storage apparatus of claim 1, wherein the fault status indicates no fault exists when a difference between the feature data and the reference data is less than or equal to a difference threshold, and wherein the fault status indicates a fault exists when the difference is greater than the difference threshold.

8. The storage apparatus of claim 1, wherein the data processing instruction instructs to write service data, wherein the data processing instruction corresponds to a first storage unit in the storage medium, wherein the controller is further configured send, to the storage medium and in response to the fault status indicating a fault exists, an updated data processing instruction instructing to write the service data into a second storage unit in the storage medium, and wherein the storage medium is further configured to execute the updated data processing instruction.

9. The storage apparatus of claim 8, wherein the controller is further configured to mark the first storage unit as an unreliable storage unit.

10. The storage apparatus of claim 9, wherein after marking the first storage unit and in response to a quantity of times an error occurs in the first storage unit being greater than or equal to a threshold, the controller is further configured to:

mark the first storage unit as a damaged storage unit; and stop using the first storage unit.

11. A method comprising:

sending, by a controller of a storage apparatus and to a storage medium of the storage apparatus, a data processing instruction;

executing, by the storage medium, the data processing instruction, wherein the data processing instruction instructs to read service data;

obtaining, by the storage medium and based on the read service data, feature data in an execution process of the data processing instruction;

performing, by the storage medium, a comparison of the feature data to reference data;

sending, by the storage medium and to the controller, a target identifier, wherein the target identifier is a first identifier or a second identifier, wherein the first identifier indicates the data processing instruction, and wherein the second identifier indicates a fault status and is based on the comparison;

receiving, by the controller and from the storage medium, the target identifier; and confirming, by the controller and based on the target identifier, that the storage medium has executed the data processing instruction.

12. The method of claim 11, wherein the target identifier is the second identifier and corresponds to the data processing instruction.

13. The method of claim 11, wherein the first identifier identifies a storage unit or the storage medium, wherein the storage unit is at least one of one or more storage units comprised in the storage medium, and wherein the storage unit is configured to be used in the execution process.

14. The method of claim 11, wherein the data processing instruction instructs to write service data, wherein the data processing instruction corresponds to a first storage unit in the storage medium, wherein the method further comprises sending, by the controller, to the storage medium, and in response to the fault status indicating a fault exists, an updated data processing instruction instructing to write the service data into a second storage unit in the storage medium.

15. The method of claim 14, further comprising marking, by the controller, the first storage unit as an unreliable storage unit.

16. The method of claim 15, wherein after marking the first storage unit and in response to a quantity of times an error occurs in the first storage unit being greater than or equal to a threshold, the method further comprises:

marking, by the controller, the first storage unit as a damaged storage unit; and stopping using, by the controller, the first storage unit.

17. The method of claim 11, wherein the data processing instruction instructs to write service data, and wherein the method further comprises deleting, by the controller, service data in a volatile storage based on the target identifier.

18. The method of claim 11, wherein the data processing instruction instructs to read service data, and wherein the method further comprises:

receiving, by the controller, the service data and the first identifier on different sending paths;

determining, by the controller, a first priority of the service data based on the first identifier; and in response to the first priority of the read service data being higher than a second priority of other data currently processed by the controller:

interrupting, by the controller, a processing process of the other data; and processing, by the controller, the service data.

19. A computer program product, comprising computer-executable instructions for storage on a non-transitory computer-readable medium that, when executed by one or more processors, cause a storage apparatus to:

send, from a controller of the storage apparatus and to a storage medium of the storage apparatus, a data processing instruction;

execute, at the storage medium, the data processing instruction, wherein the data processing instruction instructs to read service data;

obtain, at the storage medium and based on the read service data, feature data in an execution process of the data processing instruction;

perform, at the storage medium, a comparison of the feature data to reference data;

send, from the storage medium and to the controller, a target identifier, wherein the target identifier is a first identifier or a second identifier, wherein the first identifier indicates the data processing instruction, and wherein the second identifier indicates a fault status and is based on the comparison;

receive, at the controller and from the storage medium, the target identifier;

identify, at the controller, the data processing instruction based on the first identifier; and confirm, at the controller and based on the target identifier, that the storage medium has executed the data processing instruction.

* * * * *